(12) United States Patent
Boardman

(10) Patent No.: US 8,062,743 B2
(45) Date of Patent: Nov. 22, 2011

(54) SEMICONDUCTOR MATERIALS COMPRISING METAL CORE AND METAL OXIDE SHELL, AND METHODS OF PRODUCING THEM

(75) Inventor: Jeffery Boardman, Warrington (GB)

(73) Assignee: Atmos Ltd (GB)

( * ) Notice: Subject to any disclaimer, the term of this patent is extended or adjusted under 35 U.S.C. 154(b) by 720 days.

(21) Appl. No.: 11/914,370

(22) PCT Filed: May 12, 2006

(86) PCT No.: PCT/GB2006/001768
§ 371 (c)(1),
(2), (4) Date: Nov. 13, 2007

(87) PCT Pub. No.: WO2006/123116
PCT Pub. Date: Nov. 23, 2006

(65) Prior Publication Data
US 2008/0248288 A1   Oct. 9, 2008

Related U.S. Application Data

(60) Provisional application No. 60/741,904, filed on Dec. 5, 2005.

(30) Foreign Application Priority Data

May 14, 2005   (GB) .................................. 0509912.2

(51) Int. Cl.
*B32B 5/02* (2006.01)
(52) U.S. Cl. ........ 428/328; 219/543; 428/402; 428/403; 428/407; 428/327

(58) Field of Classification Search .......... 428/402–407; 523/200; 502/353
See application file for complete search history.

(56) References Cited

U.S. PATENT DOCUMENTS 3,169,851 A    2/1965  Fleming et al.
4,981,647 A *  1/1991  Rothman et al. ........... 420/584.1
(Continued)

FOREIGN PATENT DOCUMENTS
GB    2344042    5/2000

OTHER PUBLICATIONS

International Preliminary Examination Report for PCT/GB2006/001768 Nov. 8, 2007.

*Primary Examiner* — Hoa (Holly) Le
*Assistant Examiner* — Ronak Patel
(74) *Attorney, Agent, or Firm* — Rader, Fishman & Grauer PLLC

(57) ABSTRACT

A method of producing particles containing metal oxide is disclosed that includes heating metal-containing particles to oxidize metal in at least an outer shell of the particles; cooling oxidized particles; collecting the particles; and providing a distance of at least 300 mm between entry of the particles into the flame and collection of the particles. Particles may be oxidized to provide a metal oxide shell over an unoxidized metal core. A semiconductive layer of particles on a substrate may be formed by feeding, to a hot zone, such preoxidized particles; heating the particles to render the particles at least partially molten; and depositing the particles onto the substrate. The oxidation process may provide metal oxide particles in which different metals having different valencies are present in different proportions. The valencies and proportions may be selected to provide n- or p-type semiconductor layers.

22 Claims, 20 Drawing Sheets

U.S. PATENT DOCUMENTS

| | | | |
|---|---|---|---|
| 7,241,502 B2 * | 7/2007 | Anselmann et al. | 428/403 |
| 2003/0066828 A1 * | 4/2003 | Boardman | 219/543 |
| 2004/0105980 A1 * | 6/2004 | Sudarshan et al. | 428/404 |
| 2005/0040210 A1 * | 2/2005 | Sandin | 228/121 |
| 2006/0118757 A1 * | 6/2006 | Klimov et al. | 252/62.51 |
| 2007/0128439 A1 * | 6/2007 | Kim et al. | 428/404 |

\* cited by examiner

SEMICONDUCTOR MATERIALS COMPRISING METAL CORE AND METAL OXIDE SHELL, AND METHODS OF PRODUCING THEM

The present invention is concerned with semiconductor materials, in particular semiconductor materials made from metal oxides, especially transition metal oxides, and methods of making those semiconductor materials.

The present invention also relates to apparatus for detecting radiation, including ionising, electromagnetic and nuclear, e.g. neutron radiation in particular apparatus including radiation detecting semiconductor material made from metal oxides.

Conventional radiation detecting devices include scintillation devices such as Geiger counters and ionisation chambers. A diatomic gas is contained within a low pressure chamber, and the chamber has two contact areas to which voltages are applied.

The effect of radiation causes the low pressure diatomic gas to dissociate/ionise and the respective ions are attracted to the respective contact areas where they discharge. The rate of the discharge indicates the intensity of radiation, but not the energy levels.

Another type of conventional radiation detection device is a single crystal, wide band gap device.

Such devices are based on the use of extremely pure, thin, flat crystals of either sodium iodide (NaI) or cadmium zinc compounds, such as cadmium zinc telluride (CZT), which are chemically grown and then affixed to a suitable supporting base with electrical contacts. They can be of either a lateral or transverse configuration; see FIGS. 1 and 2.

They operate on the photo-conductive/photo-resistive principle. A DC voltage is applied across the crystal contacts, producing an initial current. When this activated crystal array is subjected to incident radiation, charge carriers are generated which can be seen as an increase in the current flowing in an external circuit.

Again, the increase in current flow is proportional to intensity of incident radiation, but these crystalline devices can also be used to determine the energy levels of the incident radiation by variations in the applied voltages.

A third type of conventional radiation detection device is a diode device.

Diodes are produced by combining materials with different types of electronic conduction. There are two basic material types, one with a surplus of electrons in the conduction band known as 'n' type, and one with a deficit of electrons, known as 'p' type. Layers of such materials are conventionally deposited by magnetron sputtering.

When 'n' and 'p' type materials are combined in a laminate, there is at the interface a so-called "depletion region" which is a layer or volume having no charge carriers/electrons within it. Due to the different electron concentrations on either side of this region a space charge, or EMF is developed across it.

The effect of exposing this depletion region to ionising or electromagnetic radiation is to cause charge carriers, i.e. electron/hole pairs, to be generated as a result of the photo-electric effect. The presence of these charge carriers may be detected by means of a current flowing in an external circuit.

At present, diode technology is based almost exclusively on silicon and germanium, and these semi-conductive metals are chemically impregnated, at levels of ppm, with elements of different valencies to produce 'n' and 'p' type layers, which can then form diodes.

With reference to the above types of radiation device, whilst single crystal-based devices are widely used they have a number of inherent disadvantages. For example, the NaI and CZT compounds must be produced to very high purity levels, with additions or contaminants limited to a few ppm. They are hygroscopic and hence need to be protected in suitable containers. They are also very susceptible to thermal and mechanical shocks.

Furthermore, it is extremely difficult to grow large CZT crystals and the compounds are inherently expensive.

Moreover, known diode devices also have serious disadvantages. For example, their usefulness is limited because silicon and germanium diodes need to be cryogenically cooled with liquid nitrogen to −172° C. in order to suppress their intrinsic semi-conductive properties, so that any charge carriers generated by exposure to radiation arise only from extrinsic conduction. This severely limits the temperature range over which they will operate.

Si and Ge diodes are also prone to physically break down when exposed to high intensity radiation. Indeed, the diodes are fragile and require encapsulation to protect them from atmospheric corrosion and mechanical damage.

Furthermore, they are expensive to manufacture and require complex and costly production equipment, utilising highly toxic materials and 'clean room' conditions. Even with specialist equipment it is extremely difficult to produce large area diodes.

Moreover, the electronic signals produced by Si and Ge diode devices are weak and require extensive electronic amplification.

It is also known to make transition metal oxide diode devices from particles of transition metals using a one-step flame spray oxidation and deposition process. Thus, as previously found by the present inventor (WO-A-93/26052), semiconductor material can be formed by a process in which, in a single step, a flame spray deposition process conventionally employed for deposition of elemental metals is modified so as to combine this with simultaneous oxidation to form a transition metal oxide layer. In this process, the ratio of oxygen to combustion gases, in volumetric terms, must be twice that required for stoichiometric combustion. Furthermore, the present inventor found that it was essential to use irregular particles—spherical particles did not produce a material that had semiconductor properties. It was also found to be necessary to cool the substrate onto which the material was deposited, to a temperatures between −200° C. and −20° C.

The present inventor has noted the drawbacks associated with existing radiation detection devices and methods of making semiconductor materials and the proposals described herein seek to address those drawbacks. The proposals include new methods, materials and apparatus relating to the manufacture of semiconductor materials and use of those materials in radiation detection devices. Such radiation detection devices are also described.

According to a first aspect of the invention, there is provided a method of producing particles containing metal oxide for use in semiconductor devices, which method includes the steps of
heating metal-containing particles in a flame produced by a mixture of an oxidising gas, especially oxygen, and a fuel component comprising at least one combustible gas selected from hydrogen and hydrocarbons, the oxygen being present in the mixture in a proportion of not less than 10 mole % below, and not more than 60% above, a stoichiometric amount relative to the fuel component, so as to oxidize metal in at least an outer shell of the particles;
cooling the oxidized particles by feeding them into a cooling medium, a liquid or subliminable solid medium;
collecting the cooled oxidized particles; and
providing a distance between entry of the particles into the flame and collection of the particles of at least 300 mm.

Preferably, the oxidising gas includes, and more preferably consists of oxygen, preferably substantially pure oxygen (high purity oxygen). Alternatively or additionally the oxidising gas may include one or more other known oxidising gases such as nitrogen oxides and ozone.

The cooling medium is preferably a fluid medium, which may be a liquid medium, for example water or liquid nitrogen. Alternatively, the fluid medium may be a gaseous medium, for example a cooled gas zone. Alternatively the cooling medium may include a solid, for example a sublimable solid such as solid carbon dioxide.

Usually, the metal-containing particles preferably contain substantially 100 wt % metal. The metal-containing particles may include at least one elemental metal and/or at least one metal alloy. Preferably, the particles include at least one metal alloy. Usually, the preferred particles are substantially 100 wt % metal alloy. However, for certain applications, for example, detection of neutron radiation, the particles may include an element not generally regarded as a metal, such as boron. Silicon oxide also has semiconductive properties.

Optional and preferred features of the metal-containing particles are described later.

The above described method is an oxidation process which is referred to herein as a "preoxidation" step. Thus, preferably, this step precedes a step of heating and depositing the particles so oxidised onto a substrate.

In particular, particles produced by this process may be heated and deposited in a molten state onto a substrate by a subsequent process such as a flame spray process.

As explained more fully below, particles produced by this process may have a degree of oxidation higher than particles simultaneously oxidised and deposited on a substrate by the method disclosed in WO-A-93/26052.

It is also found that metal-containing particles may be produced by a method in accordance with the first aspect of the invention which have a shell in which metal has been oxidised and a core in which metal has remained unoxidised.

Such particles are found to provide semiconductor layers having particularly desirable properties.

Such particles having a metal oxide shell and metal core and a degree of oxidation of at least 10 wt % are novel, as are such particles in which, by volume, the metal oxide shell constitutes a greater proportion of the particles than does the metal core.

Thus, in a preferred aspect of the invention, the above procedure for preparing such particles is followed by the additional steps of heating the cooled oxidised particles to render them at least partially molten and depositing the at least partially molten particles on a substrate.

According to a second aspect, the invention provides a method of forming a semiconductive layer of particles on a substrate, which method comprises feeding, to a hot zone, metal-containing particles;
heating the metal-containing particles in the hot zone to render the particles at least partially molten; and
depositing the particles in the at least partially molten state onto the substrate;

characterized in that the metal-containing particles fed to the flame are preoxidized so as to provide a shell of metal oxide material while leaving unoxidized a core of metal.

Although the hot zone may be an oven at an appropriate temperature or a zone heated by a radiation source and the deposition may be carried out by, for example, vacuum deposition, preferably the hot zone is a flame and deposition is by spraying.

Thus, in an especially preferred process in accordance with the invention, the abovementioned particles having a metal oxide shell and a metal core and a degree of oxidation of at least 10 wt % are prepared by a flame spraying preoxidation process in accordance with the first aspect of the invention, after which these particles are then subjected to a second flame spraying process in which they are deposited on a substrate.

According to a third aspect, the invention provides a metal oxide particle suitable for use as a semiconductor material, which particle has a core containing at least one elemental metal and a shell containing an oxide of the or each said metal, which particle has a degree of oxidation, expressed as a % by weight of oxygen in the total weight of the particle, of at least 10 wt %, preferably at least 15 wt %, more preferably at least 17 wt %. Preferred ranges are from 18 to 30 wt %, more preferably from 19 to 25 wt %, especially from 20 to 24 wt %. A degree of oxidation of at least 20 wt % has been found to give excellent photoconductive properties for detection of radiation, when the particles are formed into at least one layer.

According to a fourth aspect, the present invention provides a metal-containing particle suitable for use as a semiconductor material, which particle has a core containing at least one elemental metal and a shell containing an oxide of the or each metal characterised in that the ratio, by volume, of the shell:core of the particle is at least 1.1:1, preferably at least 1.2:1.

It is also found that metal oxide particles, when formed into one or more layers, may exhibit particularly desirable semiconductive properties, especially when the particles have a metal core/metal oxide shell structure with a volume ratio of metal oxide shell:metal core of at least 1.1:1, preferably at least 1.2:1, which particles additionally have a degree of oxidation, as defined with reference to the third aspect of the invention, of at least 10 wt % and preferably at the levels mentioned with reference to the third aspect of the invention.

According to respective fifth and sixth aspects of the invention, there is provided a metal oxide particle comprising an oxide of a metal, which metal is a metal alloy containing a first metal and a second metal and (a) which first metal has a valency higher than that of the second metal and is present in the particles at a molar concentration lower than that of the second metal, thereby providing metal oxide particles suitable for an n-type semiconductor; or (b) which first metal has a valency higher than that of the second metal and is present in the particles at a molar concentration higher than that of the second metal, thereby providing metal oxide particles suitable for a p-type semiconductor.

It is especially preferred that such particles (a) and (b) each have the abovementioned metal core/metal oxide shell structure with a degree of oxidation of at least 10 wt % and/or a volume ratio of metal oxide shell:metal core of at least 1.1:1, as described above.

According to a seventh aspect, the invention provides a metal oxide particle (c) having a core containing an elemental metal and a shell containing an oxide of the metal, wherein the degree of oxidation of the particle is at least 10 wt % and/or the ratio, by volume, of the shell:core of the particle is at least 1.1:1, as described above, and wherein the particle contains at least 99 mole % of a single metal and no more than 0.1 mole % of any other individual metal, thereby providing particles suitable for an n- or p-type semiconductor.

According to an eighth aspect, the invention provides a semiconductor device comprising at least one layer of particles deposited on a substrate, the or each layer being formed from particles in accordance with any one of the third to seventh aspects of the invention.

According to an ninth aspect, the invention provides a wide band gap detector comprising a layer of particles (a)-(c) in accordance with any of the fifth to seventh aspects of the invention respectively deposited on a substrate and respective electrodes spaced apart from one another and each in contact with the said layer.

According to a tenth aspect, the invention provides a diode comprising a plurality of layers of particles laminated on a substrate, at least one layer being of particles (a) or (c) so as to provide an n-type semiconductor layer and at least one layer being of particles (b) or (c) so as to provide a p-type semiconductor layer.

It is found, in particular, that the degree of oxidation of the various metal particles is an important feature in determining the semiconductor properties of a material formed from the particles. Furthermore, it is found that a particularly efficient way of increasing the degree of oxidation is to carry out a separate preoxidising step by a method in accordance with a first aspect of the invention prior to heating and depositing the particles on a substrate, preferably by a method in accordance with the second aspect.

In a method in accordance with the first aspect of the invention, metal-containing particles are at least partially oxidised by heating and then cooled. This may be a first stage, oxidation, process which is then followed by a second stage, heating and deposition, process preferably in accordance with the second aspect of the invention, in which the preoxidised metal-containing particles are rendered at least partially molten and are then deposited, in their at least partially molten form, on the surface of a substrate to form a semiconducting matrix.

In this method, where the first stage oxidation, process is carried out in accordance with a first aspect of the invention, the second stage, heating and deposition, process may be carried out in any manner which allows the particles to become at least partially molten and in which such at least partially molten particles are deposited on the surface of a substrate. However, preferably, the particles provided by the first stage process for heating in the second stage process are preoxidised by the first stage process so as to provide a shell of metal oxide material while leaving unoxidised a core of metal. The second stage is also preferably carried out by a hot, especially a flame, spraying technique, exposing the particles to an oxygen fuel flame.

In a method in accordance with the second aspect of the invention, any method may be employed for heating and depositing the particles on a substrate in which the particles are heated in a hot zone, preferably in a flame, to render them at least partially molten and then deposited in this form on a substrate. However, the particles subjected to this process must be preoxidised so as to provide a shell of metal oxide material while leaving unoxidised a core of metal. Such particles are preferably prepared by a first stage process carried out in accordance with the first aspect of the invention.

When the respective processes in accordance with the first and second aspects are combined, in the first stage, the process is controlled, as more fully described below, to achieve an efficient oxidation of a shell part of the metal-containing particles while retaining an unoxidised metal core part. In the second stager the process is preferably controlled, again as more fully described below, to confer upon the particles a high kinetic energy on impact with the substrate so that the at least partially molten particles tend to form a flattened configuration. It is believed that, during the second stage, any further oxidation which may take place is limited to about 1-2 wt %. It is believed also that the excellent semiconductive properties of the resultant semiconductor layer may be due to migration of the metal ions from the central core into the oxide shell while the particles are in their at least partially molten states both during the preoxidation and especially during the subsequent deposition process.

As mentioned above, it is preferred that the each of the first stage preoxidation process and the second stage heating and deposition process are carried out by a flame spraying technique.

Preferred flame spray techniques employ, as a combustion gas, hydrogen, propane or acetylene. Oxygen is the preferred oxidising gas. Oxygen-acetylene, oxygen-propane and oxygen-acetylene-propane mixtures are preferred.

When the first stage process is carried out in accordance with the first aspect of the invention, oxygen is present in the oxygen/fuel mixture providing the flame in a proportion of not less than 10 mole % below, and not more than 60 mole % above, a stoichiometric amount relative to the fuel component. Preferably, the molar proportion of oxygen is not more than 50% above stoichiometric and more preferably not more than 10% above stoichiometric, relative to the fuel component. Most preferably the oxygen and fuel components of the flame gas are present in roughly stoichiometric amounts. In particular, if the proportion of the oxygen component is too low, the flame may become too smoky, while if too high, the flame temperature may be undesirably reduced. On the other hand, it is possible to increase the amount of oxygen in the flame (but not to an extent sufficient to encourage carbide formation, especially with chromium) up to a 50 or 60% excess because such enrichment of oxygen increases the length of the flame, thus compensating for any reduction in flame temperature. Thus, by controlling the respective amounts of oxygen and fuel components of the flame gas in this manner, a particularly high oxidation temperature may be achieved.

Suitably, measurement of stoichiometric levels of oxygen and fuel is achieved using accurate mass flow control devices.

The feed rate of fuel to the flame is preferably at least 10 l/min, preferably from 15 to 25 l/min. For a stoichiometric amount of oxygen the required volume ratios of oxygen/fuel would be 2.5:1 for acetylene (most preferred), 3.3:1 for propane and 0.5:1 for hydrogen. Especially for acetylene, typical feed rates are from 40 l/min $O_2$:16 l/min acetylene to 50 l/min $O_2$:20 l/min acetylene.

Typically a burner unit is used to carry out flame spraying. The burner unit may comprise a block, preferably a ceramic block having a central conduit through which the powder may be directed downwardly and respective channels, preferably L-section channels, for the supply of flame gases, some channels being for the supply of oxygen and others for the supply of the fuel components. Each L-section channel has one leg extending laterally inwardly of the block and terminating short of the central conduit and another leg extending downwardly of the block and in fluid communication with a ring of burner nozzles, for example, 6 or 8 burner nozzles, at a lowermost face of the block and coaxial with the central conduit through which the powder flows.

Typically, the flame spraying technique may heat the particles to temperatures in excess of 1000° C. A preferred flame temperature is 1000° C.-1500° C., more preferably 1100° C.-1400° C. and most preferably 1200° C.-1300° C., providing a powder temperature of about 1200-1300° C., typically 1250° C.

An upper limit to the powder temperature desired is governed by the melting temperature of the metal or alloy to be treated. For some powders, too high a temperature may result in excessive vaporisation losses.

In order further to increase the temperature and length of the flame, a heat resistant tube, for example of high temperature glass, may be fitted around the flame.

The metal particles may be fed, in the form of a powder, into a burner nozzle, from a powder feed unit, by means of a tube, for example, a flexible tube and carried within a stream of oxygen. The oxygen stream may have a flow rate of 1-20 litres/mm, preferably 3-15 litres/min, more preferably 5-13, especially 10-12 litres/min.

The particle feed rate is preferably from 10 to 25, more preferably 15 to 20, g/min.

Additionally or alternatively, it has been found that the oxidation process may be enhanced if the flames and powder issuing from the block are surrounded by a shroud of oxygen, preferably high purity oxygen, as this increases the amount of oxygen available for the molten metal particles to react with. Accordingly, the method preferably includes the step of providing a shroud of oxygen around the particles when they are heated.

Such an oxygen shroud ma be provided by directing an additional stream of oxygen from a region, surrounding the vicinity of entry of particles into the flame, along a frusto-conical path inclined towards the travel path, and in the direction of travel, of the particles through the flame so as to provide the shroud of oxygen surrounding and impinging onto the flame.

In practice, one way of providing an oxygen shroud is to mount a hollow metal ring around the burner nozzle tip, the ring having a series of small holes drilled into it, in the same direction as the burner nozzle holes, such that when oxygen is fed into the ring it preferably exits as a series of fine streams around the circumference of the flame.

When the flame is surrounded by a heat resistant tube, a ring of inclined nozzles may be dispersed around the top edge of the tube, through which nozzles oxygen may be directed at the flame within the tube in the form of a vortex.

As can be seen from the above, oxygen may be provided by each of (a) the oxygen/fuel component mixture, (b) the particle feed gas and (c) the oxygen shroud.

Preferably, the total molar amount of oxygen provided by the total of (a), (b) and (c) is not more than 80%, more preferably not more than 60%, above a stoichiometric amount relative to the fuel component.

In one example of the preoxidising step, metal-containing powder is passed into the centre of the flame utilising a 1/16" standard metal cutting or burning nozzle having the central hole bored out to 2.0/3.0 mm. These cutting nozzles are so configured that the central hole is surrounded by six other holes from which the flames issue and so provide an accurate means of heating the powder.

The oxidation reaction of the metal particles is believed to be a time/temperature/surface area dependent process influenced by the rate at which the metal particles are fed into the flame and the surface area per unit volume of the powder being processed.

The surface area dependency may include a dependency on the particle size range distribution.

Particle size distribution may be determined by a Malvern laser particle size analyser, which measures the maximum particle size, referred to, for example, as −38 μm and a minimum particle size, referred to, for example, as +1 μm.

For many metal-containing particles, the maximum particle size of the metal-containing particles prior to oxidation is preferably from −30 to −50 μm inclusive, more preferably from −38 to −45 μm. However, for higher melting point metals and alloys, such as iron, chromium, cobalt, nickel, manganese and vanadium, smaller particles having a maximum size of, for example −25 μm, may provide a desirable increase in degree of oxidation without too great a loss of metal through vaporisation.

The minimum particle size of the metal-containing particles prior to oxidation is preferably at least 1 μm, more preferably at least 2 μm.

Particle size distribution may also be determined in terms of the average particle size.

The average particle sizes described herein are given as a volumetric weighted mean for a Gaussian distribution and are therefore number average particle sizes.

The average particle size of the metal-containing particles prior to oxidation is preferably from 5 to 25 μm, more preferably 15 to 20 μm, inclusive.

The particle size of the metal-containing particles may be selected so as to control the ratio of surface area to volume of the particles which may affect the extent of oxidation as discussed later. For example, a smaller particle size may be selected to increase the extent of oxidation.

The reaction time for the oxidation process may be controlled in terms of the distance from the entry of the particles into the flame, i.e. from the burner nozzle tip, to entry into the cooling fluid, e.g. the surface of water in a collecting vessel. This distance is at least 300 mm, preferably at least 500 mm. Preferred ranges are in the range 500 mm-900 mm, more preferably 450 mm-850 mm, still more preferably 500 mm-800 mm, especially 600 mm-700 mm. Accordingly, the method preferably includes the step of flame spraying the metal-containing particles wherein the nozzle tip is spaced from cooling means (e.g. water bath) by the distances set out above. The preferred longer distances allow a sufficient period for efficient oxidation.

In order to increase oxidation, except for certain lower melting point metals and alloys where undesirable vaporisation may occur at high flame temperatures, it is desirable to use as hot a flame as possible and to allow the metal to remain in the flame for as long as possible. Preferably, the metal-containing particles remain within the flame for a period from about 0.5 to about 1.2 seconds. Amounts of oxygen and fuel gas at or close to stoichiometric provide a hotter flame, while a higher throughput of fuel gas increases the length of the flame.

The above mentioned longer distances between entry of the particles into the flame and quenching allow for such longer flame lengths and also allow more time for the partially oxidised particles to cool, especially after having been subjected to the hotter flame temperatures, before being quenched.

In the preoxidising step the particles are preferably rapidly cooled or quenched. For example, they may be cooled by collecting them on a bed of solid carbon dioxide or in liquid nitrogen or, most preferably, by quenching them in a liquid medium which, at least initially, may be at room temperature such as water. The quenched preoxidised particles can then be recovered from the liquid medium by e.g. filtering and drying/evaporation. In preferred embodiments the particles are flame sprayed into a bath of water, which, during the process tends to heat up from room temperature to about 40° C. Such quenching in water provides an efficient means of cooling particles that have been treated to such high temperatures as described above.

Thus, the method avoids the need, after particularly high temperature oxidation, to deposit the particles on a substrate provided with special cooling means.

The cooled oxidised particles may be collected simply by filtering and drying.

The size of the metal oxide particles produced by the above oxidation process may be somewhat different from that of the metal particles fed into the flame. This is because
(i) absorption of oxygen and its reaction with the metal may cause the particles to grow during the reaction, thus increasing the maximum particle size as measured by a Malvern laser particle size analyser and also increasing the average particle size;

(ii) metal particles available commercially are usually highly irregular in shape and, in this case, measurement by means of a Malvern laser particle size analyser may be less accurate where passage of a particle through a sieve is prevented by its longest length; and (iii) evaporation of very small particles may occur, increasing the maximum particle size as measured by the Malvern particle analyser and also the average size of the particles.

Thus, preferably, the maximum particle size of the particles after oxidation is from 40 to 50 μm inclusive, while the minimum particle size is at least 6 μm.

The preferred average particle size is 10-35 μm, more preferably 15-35 μm, still more preferably 20-30 μm, especially 20-25 μm.

The particles produced by a method in accordance with the first aspect of the present invention preferably have a distinctive configuration and this configuration of the metal oxide particles may be relevant to an understanding of the semiconductor properties of the particles.

In particular, the particles typically have a metal centre surrounded by and preferably enclosed within an oxide shell. Preferably, the metal oxide shell is polycrystalline.

There are two mechanisms by which the oxidation reaction may proceed. The first is where oxygen percolates through the oxide layer being formed to react with the molten metal below, and the second is where the molten metal percolates through the oxide layer being formed to react with the free oxygen surrounding the molten particle.

Bearing in mind the difference in atomic sizes between oxygen and a metal, it is probable that the first mechanism is the faster and more effective. It is probable that those metals and alloys with the higher degrees of oxidation (see Tables 3 and 5 below) work with the first mechanism and those with the lower degrees with the second.

An indication of the relationship of metal core size to overall oxidised particle size can be found by determining the degree of oxidation by weight of the particle. The degree of oxidation, by weight of the particle, i.e. the weight of oxygen as a percentage of the total weight of the particle, is preferably at least 10%, more preferably at least 15 wt %, still more preferably at least 17 wt %, especially at least 20 wt % and possibly as high as 40 wt %, while a preferred range is 18-30 wt %, more preferably 19-25 wt % and most preferably 20-24%. As explained below, this enables a much broader band of oxide to be provided around the metal core.

Examples of degrees of oxidation are given in Tables 3 and 5 later (values determined by London and Scandinavian Metallurgical Services using LECO analysing equipment).

From the derivatives of the metals and oxides in the particles and the degree of oxidation, the volumetric ratios of the dimensions of the shell and core of the oxidised particles can be estimated.

A preferred ratio of volumes of shell:core is from 1.1:1, more preferably at least 1.2:1, for example 1.4:1 or even 1.5:1.

Typically, metal oxide particles having a degree of oxidation of about 20% and a shell:core volume ratio as follows give particularly good results: $Cr_2O_3/Cr$=1.20:1; $FeO/Fe$=1.260:1, $NiO/Ni$=1.213:1, $CoO/Co$=1.246:1.

The nature of the metal-containing particles (i.e. the nature of the metal and/or metal alloy) may affect the extent of oxidation. For example, some metals and metal alloys may undergo a higher degree of oxidation than other metals and metal alloys, under the same conditions. The present inventor has found that the extent of oxidation may, among other things, also be affected by the particle size, in particular the surface area to volume ratio of the metal-containing particles. Accordingly, one preferred method of controlling the extent of oxidation is to select appropriately size metal-containing particles with respect to the nature of the metal and/or metal alloy in the particles.

As described above, such particles, obtained by a first stage, oxidation, process in accordance with a first aspect of the invention, may be deposited on a substrate to form a semiconductor layer thereon by a second stage, heating and deposition, process preferably carried out in accordance with a second aspect of the invention.

In particular, the metal oxide particles having a metal oxide shell but retaining a metal-containing core, obtained by a flame spray oxidation process in accordance with the first aspect of the invention are preferably heated by a flame spray process in which the particles are heated in a flame so as to render them at least partially molten and thereafter deposited substantially in that state onto a substrate.

The flame spray conditions adopted in the second stage, heating and deposition, process may be similar to those adopted in the first stage, oxidation, process at least insofar as the same apparatus may be employed.

However, preferably, in the second stage process, the particles are those received from the first stage and, after heating, they are deposited on a substrate. Preferably one of the particle source and its associated flame and the substrate moves relative to the other in a parallel plane so as to spray the particles over different regions of the substrate. Usually, either the flame is moved horizontally above the substrate or the substrate is moved horizontally below the flame. Preferably, it is the flame that is moved. In particular, in practice, a spray gun may be employed which both directs the particles at the substrate and provides the flame through which they pass. Such a spray gun may be much lighter and easier to move than the substrate. Such relative movement is also preferably extremely rapid so as to avoid overheating of the substrate. For example, the rate of movement, which may depend upon the desired thickness of the deposit being laid (the thicker the deposit required, the slower the relative viscosity) may be in the range 200-600 mm/s.

In addition, in contrast to the preferred relatively long distance between entry of the particles into the flame and the surface of the liquid (or sublimable solid) in which they are collected, which relatively long distance is provided to allow the oxidation to take place in the first stage oxidation process, in the second stage, heating and collection process, the distance between entry of the particles into the flame and the surface of the substrate is preferably relatively short, i.e. preferably from 100 to 10 mm, more preferably from 110 to 150 mm, inclusive.

This short distance allows the particles to retain their at least partially molten form on impact with the substrate and to retain a considerable amount of their high kinetic energy, allowing the particles to become flattened on impact with the substrate and provide a good, strong, homogeneous deposit.

Preferably, the particles in this second stage remain within the flame for about 0.2 seconds to about 0.5 seconds.

Although, in this second stage, heating and deposition, process, the particles may be entrained in oxygen and/or a shroud of oxygen may surround the flame within a heat resistant tube, this is not particularly necessary and the particles may be entrained in either a reactive gas such as oxygen, a partially reactive gas such as compressed air or an inert gas such as nitrogen.

Thus, the flame temperature may lie within the range 800-1300° C., preferably 900-1000° C. Preferably, this provides a powder temperature on collection of about 400-500° C.

During both the first and second, heating and deposition, stages the metal-containing particles and preoxidised particles respectively may become molten to some degree within about 10 mm from the exit tip of the nozzle, at which point they are within the hottest part of the flame. This can be visually observed as being the brightest area of the flame.

In this second stage process, although an increase in the degree of oxidation of the particles may occur, this is usually not more than 1-2%, and this is preferred.

Accordingly, although the particles may be flattened somewhat on deposition, their average particle size remains similar to that of the preoxidised particles and is not significantly increased by oxidation.

As compared with the single stage oxidation and deposition process disclosed in WO-A-93/26052, the first stage, preoxidation process in accordance with the first aspect of the invention differs at least in that a considerably lower proportion of oxygen in the combustion gases as compared with fuel is fed to the flame, thus allowing a higher oxidation temperature to be achieved, and in that a longer distance is allowed from entry of the particles into the flame to their collection region, while the second stage, heating and deposition process in accordance with the second aspect of the invention differs from the process disclosed in WO-A-93/26052 in that the particles employed are preoxidised particles having a metal oxide shell surrounding a metal-containing core, which, on deposition thereof onto a substrate, may assume a somewhat flattened condition, providing a semiconductor layer having excellent detection properties. Thus, the division of the process into two stages, in accordance with respective first and second aspects of the invention allows the first stage to provide considerably improved oxidation and semiconductive properties, while the second stage, which may be carried out using shorter spray distances, may then give a much more uniform, homogenous and cohesive metal oxide deposit.

Thus, the combination of the respective processes in accordance with the first and second aspects of the invention allows optimisation of the respective conditions for, on the one hand, oxidation and, on the other hand, deposition onto a substrate. Thus, the degree of oxidation attainable with the process of WO-A-93/26052 is in the region of 4-9 wt % as compared with values up to 28% using a process in accordance with the invention. In contrast with the process of WO-A-93/26052, the process of the invention is effective irrespective of the shape of the metal particles.

In addition to the above, the present inventor now finds that certain metals and metal alloys, some commercially available in powder form may be oxidised to produce metallic oxides having 'n' or 'p' type semi-conductive properties, and that these oxides may be applied to a wide variety of both conducting and insulating substrate materials, by flame spraying/thermal deposition processes, preferably using the procedures described above, to produce either single layer wide band gap semi-conducting radiation detecting sensors, or combined as multi-layer, semi-conducting oxide diode radiation sensors.

In order to obtain partially oxidised particles having useful 'p' and 'n' type properties, the appropriate metal-containing precursor particles should be selected.

A preferred precursor particle and a metal oxide prepared therefrom comprises, in an amount, by weight of the total weight of the precursor particle and metal component of the metal oxide particle respectively, at least 94 wt % of at least one metal element, in elemental form or as part of an alloy, the or each said metal element of the said at least 94 wt % being present in an amount of at least 5 wt % by weight of and selected from transition element numbers 21-29, 39-47, 57-79 and 89-105 and indium, tin, gallium, antimony, bismuth, tellurium, vanadium and lithium, and optionally up to 6 wt %, by weight of the total weight of the metal component, of at least one additional element and including any impurities.

More preferred transition metals, in particular one or more metals selected from Sc, Ti, V, Cr, Mn, Fe, Co, Ni, Cu, Zn, Y, Zr, Nb, Mo, To, Ru, Rh, Pd, Ag, Cd, La, Hf, Ta, W, Re, Os, Ir, Pf, Au and Hg. These metal(s) may be present as elemental metal and/or as a metal alloy e.g. as a major or minor component.

Another preferred group of metals is the lanthanides. A further preferred group is the actinides. In particular, it is believed that the incorporation of such lanthanides and actinides into semi-conductive metal oxide sensor/detector devices produced in accordance with the invention may improve their sensitivity. Other useful non-transition metals include In, Sn, Ca, Sb, B and Te. Again, these can be in their pure form or alloyed in varying proportions with other metals.

In the case of alloys, it is preferred that the alloy includes elements selected from Group I and Group II metals (in particular Li, Be, Na, Mg, K, Ca, Rb, Sr, Co and Ba), Al, Si, P, S, Ga, Ge, As, Se, In, Sn, Sb, Te, TI, Pb, Bi and Po. These elements are preferably present as a minor component. It is also preferred that the minor component or "dopant" in a metal alloy is a metal selected from the actinide or lanthanide series.

As can be see from the above, since elements such as boron and silicon exhibit semiconductive properties and may form alloys with metals, for the purposes of this invention, such possibly non-metallic elements are nevertheless regarded as "metals".

Lower melting point alloys and metals, melting at temperatures of, say, up to 650° C. (generally having higher atomic numbers e.g. Pb, In, Sn, Ga, Sb, Bi and Te) may provide particular advantages. An alloy of lead with tin or antimony may give particular good semiconductive properties when oxidised in accordance with a process in accordance with the invention.

In especially preferred partially oxidised particles, the or each element has at least one valency of at least 2, more preferably at least 3. Indeed, poor results may be achieved if a metal having a valency of only 1 is present to any significant extent.

In one preferred embodiment of the invention, the or each element is selected from nickel, chromium, cobalt, iron and manganese.

More preferably, a metal-containing precursor compound for, or the metal component of, such a metal oxide particle comprises, by weight of the total weight of the metal-containing precursor compound or metal component, at least 99.5 wt % of a single transition metal selected from chromium, cobalt, iron and nickel, or at least 99.5 wt % of an alloy of at least two metals each selected from chromium, cobalt, iron and nickel, manganese and no more than 5 wt % of aluminium as an optional additional element, the balance being any impurities.

Still more preferably, such a metal-containing precursor compound for, or the metal component of, such a metal oxide particle comprises at least 99.5 wt %, by weight of the total weight of the metal-containing precursor compound or metal component, of an alloy selected from manganese (34 wt %)-nickel (66 wt %), iron (75 wt %)-chromium (30 wt %)-aluminium (5 wt %), iron (50 wt %)-nickel (50 wt %), iron (50 wt %)-cobalt (50 wt %), iron (50 wt %)-chromium (50 wt %), nickel (50 wt %)-chromium (50 wt %), nickel (95 wt %)-aluminium (5 wt %) and iron (58 wt %)-nickel (29 wt %)-cobalt (17 wt %).

Such particles are particularly suitable for the preparation of semiconductor devices for detecting electromagnetic radiation or as diodes.

In an alternative preferred embodiment, the or at least one said element of the metal oxide particle is selected from vanadium, gadolinium and boron.

More preferably, such a metal-containing precursor compound for or metal component of, such a metal oxide particle comprises at least 95.5 wt %, by weight of the total weight of the metal-containing precursor compound or metal component, of vanadium or of an alloy of at least one element selected from vanadium, gadolinium and boron and at least one element selected from iron, cobalt, nickel and chromium, the balance being any impurities.

Still more preferably, such a metal-containing compound for, or metal component of, such a metal oxide particle comprises at least 95.5 wt %, by weight of the total weight of the metal-containing precursor compound or metal component, of the single metal vanadium, the balance being impurities or of an alloy selected from iron (82 wt %)-vanadium (18 wt %), gadolinium (34 wt %)-cobalt (66 wt %), iron (82 wt %)-boron (18 wt %), nickel (82 wt %)-boron (18 wt %) and iron (5 wt %)-chromium (80 wt %)-boron (15 wt %).

Such particles are particularly suitable for the preparation of a device for detecting neutron radiation. The present inventor also finds that alloys which have a minority molar component with a higher valency than that of the major component produce 'n' type semi-conducting oxides, and that those alloys which have a minority molar component with a lower valency than that of the major component produce 'p' type semi-conducting oxides.

Additionally, it has been determined that certain metal oxides wherein the metal consists of at least 99 mole % of a single metal and no more than 0.1 mole % of any other individual metal, and especially certain pure metals, when oxidised, have 'n' and 'p' type semi-conducting properties. Pure metals which demonstrate 'p' type semi-conductive properties include iron, chromium, cobalt and nickel. Indeed, in the case of nickel, partially oxidised particles having a degree of oxidation of up to about 20% tend to exhibit 'n' type semi-conductive properties, while at a degree of oxidation of about 20% or above, they exhibit 'p' type properties.

Metal alloys which demonstrate 'n' and 'p' type characteristics when oxidised may consist of only two transition metals having different valencies, or of three or more metals having different valencies, some but not all of which are from the transition region of the periodic table.

In a metal oxide particle comprising a metal alloy containing a first metal having a valency higher than, but present in a molar amount lower than, that of a second metal, and suitable for an n-type semiconductor, the first metal may be selected from manganese, chromium, nickel, cobalt, vanadium and gadolinium and the second metal may be selected from iron, nickel and cobalt.

Typical alloys giving n-type metal oxides are (majority component first) Ni—Mn; Fe—Cr—Al; Fe—Ni; Ni—Al; Fe—Co; and Cr—Fe.

In a metal oxide particle comprising a metal alloy containing a first metal having a valency higher than, and present in a molar amount higher than, that of a second metal, and suitable for a p-type semiconductor, the first metal may be selected from iron and boron and the second metal may be selected from nickel, cobalt and boron.

Typically alloys giving p-type metal oxides are (majority component first) Cu—Ag; Fe—Ni—Co; and Cr—Ni.

Tables 3 and 5, in the Examples below, set out specific examples of compositions of alloys which have 'n' and 'p' type semi-conducting properties when oxidised by a process embodying the invention.

The semiconductor properties of a matrix formed from such metal oxide particles in particular may be improved if those particles have undergone a two-stage preoxidation and subsequent deposition process, especially when the respective preoxidation and deposition processes are carried out by the methods in accordance with the respective first and second aspects of the invention.

The oxide shells formed around the metal cores of the oxidised metal powder particles produced by a preferred method in accordance with a first aspect of the invention may be virtually insulating at ambient temperatures, and one would expect that a flame sprayed deposit consisting of randomly distributed metal particles within an insulating oxide matrix would have zero conductivity under ambient conditions, but surprisingly, this is not the case.

A possible explanation of the phenomenon of ambient conduction, is set out as follows.

Electrons may 'escape' from the metal core and diffuse into the bulk oxide in the same way that electrons escape from a metal into a vacuum.

This may lead to a 'cloud' of excess electrons around each metal particle, whose negative charge is compensated for by a positive charge on the surface of the metal core. The probability of this state arising is high based on the fact that the work function of an oxide is much higher than that for a metal.

The migration of electrons from the metal core into the bulk oxide causes space charges to be generated, and where the concentration of metallic inclusions within the bulk oxide matrix is sufficiently high, then the space charges around the metal particles can overlap and form continuous conductive paths through the composite material. It is also possible that degrees of structural disorder in the bulk oxides, for example due to the flame spray deposition process, will enhance the mobility of the electrons within the oxide matrix.

Indeed, it is found that particularly desirable conductive properties may be achieved when using a flame spray deposition process in accordance with the second aspect of the invention.

The metal oxide particles may be deposited onto a variety of insulating or electrically conductive substrate materials and may be used for radiation detection devices such as single layer wide band gap devices. These may be used as replacements for current NaI and CZT devices.

They may have a number of advantages, including resistance to atmospheric corrosion, which means that they do not necessarily need protective containment. It is possible to provide devices which are not susceptible to thermal or mechanical shock and are far more robust than e.g. NaI devices.

A further advantage is that they may not need 'clean room' conditions or high purity materials. The method utilises commercially available, and therefore inherently cheaper materials. The metal oxide devices can be easily manufactured in large area sizes, up to metres square.

In addition to simple layered structures, the metal oxides may be produced in three dimensional shapes. For example, shapes which may be defined by a mathematical equation and used as part of a computer control program for a robot.

The semi-conductive 'n' and 'p' type metal oxide particles can also be deposited on a substrate to form a plurality of layers, for example to produce diodes.

A diode can be made by hot (e.g. flame) spraying an 'n' or 'p' type oxide layer onto a metal substrate, or insulating substrate, to which a conductive layer has been applied and then by hot (e.g. flame) spraying a second layer of semiconductive oxide onto the first, but of smaller area, such that if the first layer is 'n' type, then the second layer will be 'p' type, or vice versa.

A contact layer is then applied to the upper surface of the second oxide layer such that when a voltage is applied between the substrate and the top contact layer a current flows through the two oxide layers in the direction of the applied voltage.

Diodes may also be produced by combining three oxide layers in the sequence of 'n', 'p', 'n' or 'p', 'n', 'p', as shown in FIGS. 3 and 4.

Radiation detectors in general may be exposed to radiation sources which emit energies of widely different intensities and energies.

Some sources emit low intensity but high energy radiation, and others, such as X-ray sources, emit high intensity but low energy radiation.

In dependence upon the nature of the radiation to be detected, the ability of certain metals to capture particular types of radiation may be utilised by incorporating them within the semiconductor system when producing n- and/or p-type layers. For example, for detecting neutrons, metals such as gadolinium, vanadium, boron, lithium and uranium 235 may be included and may be combined with the above-mentioned transition metals.

When these metals are oxidised in accordance with the present invention, either singly or in alloy form, they may be semi-conductive. They may have a double reaction as neutron detectors: firstly, when fast moving neutrons are captured, their kinetic energy will be converted to thermal energy raising the temperature and consequently reducing the resistance of the oxides. Secondly, and simultaneously, the capture of the neutrons will general alpha, beta and gamma radiation, which in turn will generate charge carriers, both effects being detected by an increase in the current flowing in an external circuit.

Preferably, the thickness and hence the resistance of a diode made from metal oxide particles as described herein can be varied. This may be achieved by increasing the number of layers of the semi-conductive oxides being flame sprayed, or thermally deposited.

Accordingly, it may be possible to 'tailor make' both the single layer, wide band gap and multi-layer diode detection devices to match the radiation emitting from a particular source and so optimise the efficiency and sensitivity of such devices.

It is found that radiation detection devices made by a procedure which includes a preferred preoxidation method in accordance with a first aspect of the invention will produce higher energy signals than existing devices under the same conditions, with the result that they may be capable of operating with lower voltages and in less complex electronic equipment.

Diodes made from metal oxide particles so produced may have advantages over existing devices based on silicon and germanium technology.

Such advantages may include an appreciable cost reduction over known silicon or germanium devices. The metal and metal alloy particles used as starting materials are inexpensive metals. By way of an example, the cost of a binary transition metal alloy powder may be in the region of $3 per gram. In contrast, germanium costs in the region of $900 per gram. A production process in accordance with the invention preferably involves only flame spraying which typically has low capital and running costs.

The flame spraying production process is efficient and flexible; it can even be tailored to produce small numbers of specific devices. The capacity to produce small numbers of devices for particular requirements at a reasonable cost is an important advantage in the competitive field of semiconductor materials.

The semiconductor materials made in accordance with the aspects of the invention described herein comprise metal oxides, especially preferably, transition metal oxides, and these are preferably resistant to high levels of radiation and corrosion from weak acids and bases. This makes them more robust and should result in a longer operating life than Si and Ge devices.

Preferably the semiconductor materials can be produced by depositing the oxides onto a substrate, for example a metal substrate, using a robot. It is preferred that the deposition process is automated. In this way, the size of the semiconductor material need only be limited by the size of the process robot. For example, an oxide layer may be produced on substrates up to 2 $m^2$. Such large devices are simply not possible with current silicon and germanium technology.

The method can utilize a wide range of different oxides derived from transition metals and metal alloys. The band gap value of the resultant semiconductor material can be tailored by varying the alloy composition. This preferably permits the manufacture of semiconductor materials having improved sensitivity and "tailor-made" properties to suit e.g. particular types and wavelengths of high intensity radiation.

The ability to produce large areas of semiconductor material may result in more powerful signal generation. A more powerful signal will preferably increase the output signal from the radiation detection device and this means that the electronic data selection equipment used to process the output signals can be less complicated, thereby reducing the costs.

The semiconductor materials preferably operate at ambient temperatures but the above metal oxides are suitable for when they operate at temperatures above ambient. In preferred embodiments, optimum performance is achieved at ambient temperatures. The ability to work at and around room temperature may eliminate the need to use cryogenic cooling during use of the devices made with the semiconductor material.

Having made a semiconductor material it is then necessary to attach electrical contacts to the material so that a voltage can be applied to the material and current flow through the material detected so as to determine the intensity of radiation.

The contacts may be made of copper, aluminium or nickel which is deposited onto a substrate and/or semiconductor material. For example, metal contacts may be deposited by magnetron sputtering. Alternatively, the contacts may be flame sprayed onto a substrate or metal oxide layer. This approach reduces the cost and complexity of existing contact methodology.

It is believed that single layer oxide devices may generate charge carriers from the photo-conductive effect and that combinations of 'n' and 'p' type oxides generate charge carriers by virtue of the photo-electric effect.

Preferably, devices consisting of two thick layers of 'n' and 'p' type oxides will produce charge carriers from both effects, resulting in more powerful and efficient detectors.

The semi-conductive metal oxide sensor/detector devices described herein may have their sensitivity improved by exposure to electromagnetic fields during operation. As noted earlier, sensitivity may also be improved by the inclusion of elements from the actinide and lanthanide series.

The generation of charge carriers within the semi-conductive oxides may be enhanced by the cascade effect, whereby incoming high energy radiation will generate electrons, which have sufficiently high energies to generate more secondary electrons.

A method of the present invention can use either spherical or irregular particles and the pre-oxidation step enables oxidation levels of e.g. 20-24% to be achieved easily, which provides a higher degree of semi-conductivity, an increased amount of oxide in the flame sprayed matrix, and better generation of charge carriers.

The pre-oxidation step, whereby oxidations of e.g. 18-28% by weight are achievable, may eliminate the requirement for quenching at the same time as deposition. The increased degrees of oxidation are thought to give grain boundaries with greater electronic energies.

Stoichiometric oxygen/fuel mixtures can be used, both during the pre-oxidation process and the flame spraying/thermal deposition steps. Stoichiometric oxygen/fuel gas mixtures produce the maximum flame temperatures, giving enhanced pre-oxidation conditions and more dense and uniform flame sprayed/thermally deposited oxide layers, by virtue of the fact that the particles being oxidised and deposited are at higher temperatures.

Embodiments of the present invention will now be described in more detail with reference to Examples and Experiments illustrating the principles of the invention and also to the accompanying drawings in which.

DETAILED DESCRIPTION OF EMBODIMENTS AND EXPERIMENTS

Figure 1A:
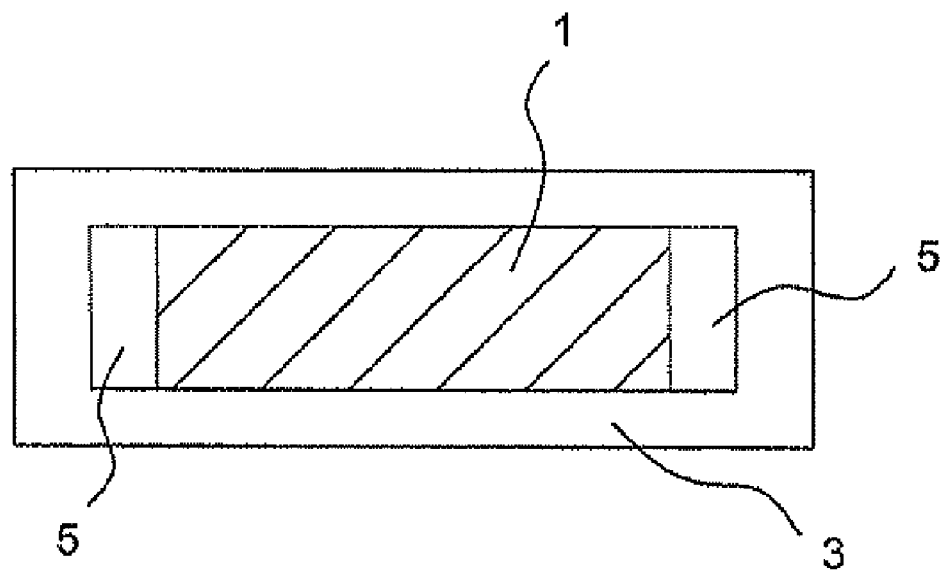
FIG. 1a shows a lateral configuration of a single layer radiation detector in plan view.

FIGS. 1 to 4 show single layer and multilayer diode radiation detection devices whose general structure is known from the prior but are also examples of radiation detection device structures of embodiments of the present invention.

FIG. 1 shows a single layer wide band gap detection device 1 on a substrate 3. Contacts 5 are located at both ends of the single layer 1. In use a voltage is applied across contacts 5 so that when incident radiation 7 generates charge carriers within the single layer 1 a current flow is detected in an external circuit. In the prior art, single layer 1 would be, for example, a NaI single crystal. In an embodiment of the present invention, single layer 1 can be a metal oxide, for example a transition metal oxide, either n-type or p-type. Preferably, the metal oxide particles have a metal core and an outer oxide shell and more preferably have a degree of oxidation of from 18 to 25 wt %.

Figure 1B:
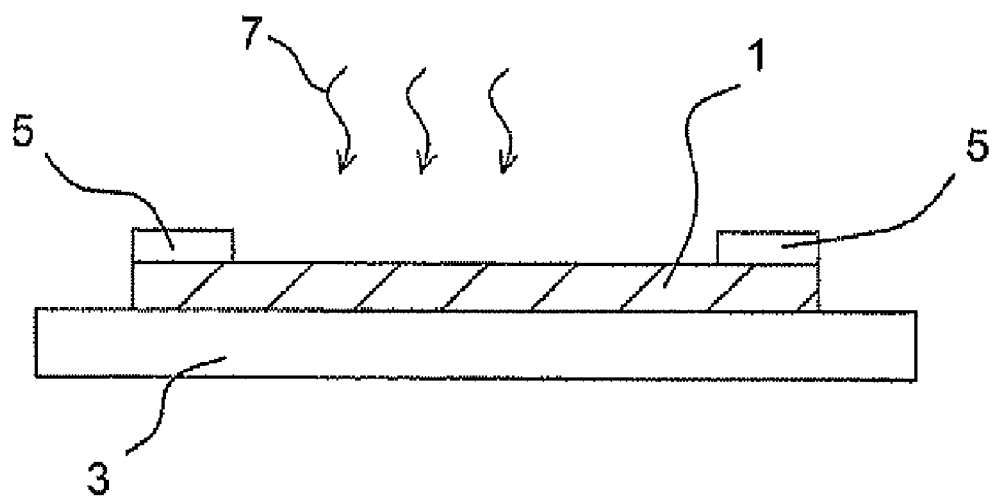
FIG. 1b shows the single crystal layer detector of FIG. 1a from a side view.

The single layer detection device shown in FIGS. 1a and 1b has a "lateral" configuration in which contacts 5 are spaced apart laterally of one another and are disposed on the single layer along respective opposed longitudinal ends thereof. This is referred to hereinafter as a "lateral configuration".

Figure 2A:
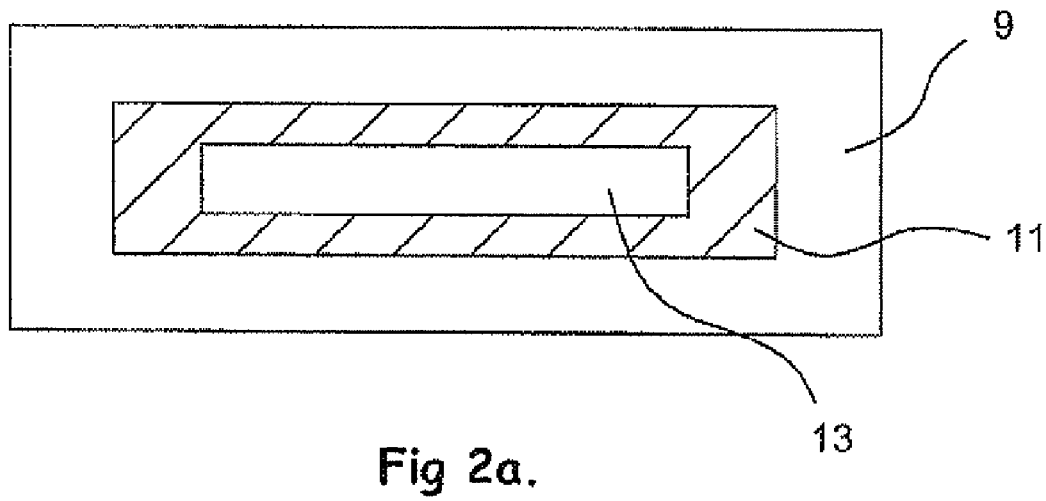
FIG. 2a shows a transverse configuration of a single layer radiation detector in plan view.
Figure 2B:
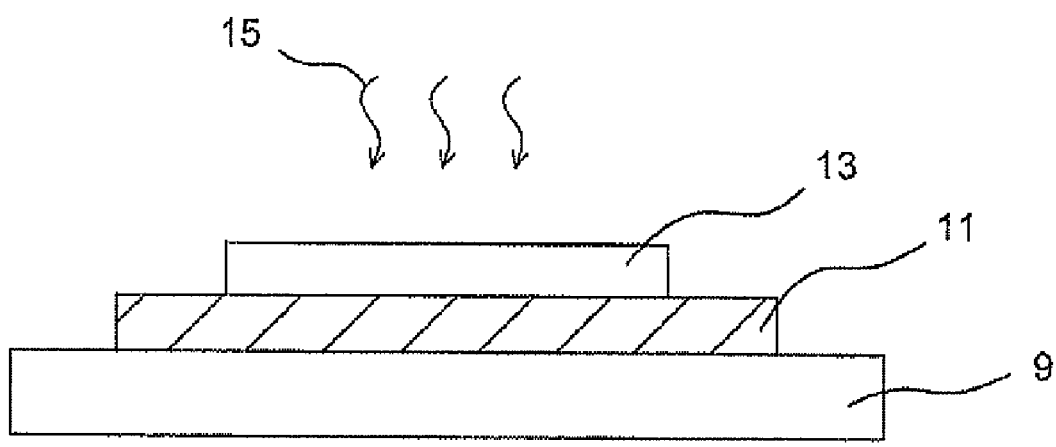
FIG. 2b shows the same single layer device from a side view.

The radiation detection device shown in FIGS. 2a and 2b is also single layer detection device, this time with a "transverse" configuration in which the single layer is disposed between a contact and a conductive support.

In this configuration, substrate 9 supports a single layer 11 and contact 13 is placed along the length of the single layer. Substrate 9 is conducting and a voltage is applied across substrate 9 and contact 13. Incident radiation 15 generates charge carriers in a single layer 11 and a current is detected in an external circuit.

In devices of the prior art the single layer 11 can be a CZT single crystal. In embodiments of the present invention the single layer 11 can be a metal oxide matrix, for example a transition metal oxide matrix, either n- or p-type. The metal oxide matrix may be obtained by deposition, in an at least partially molten state, of preoxidised metal-containing particles as described above.

Figure 3A:
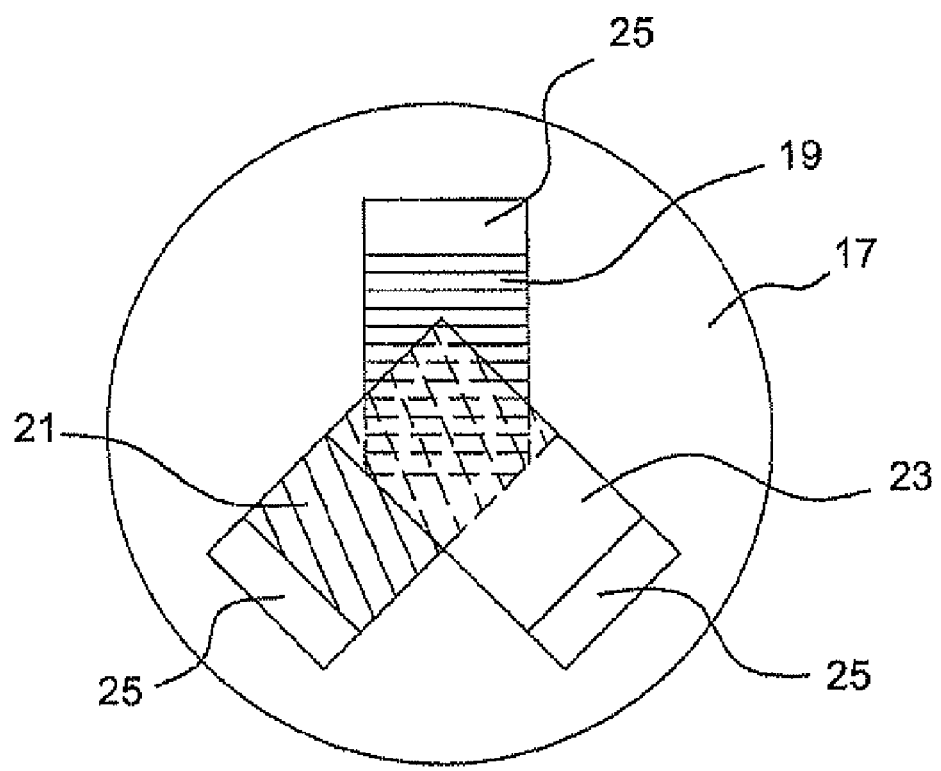
FIG. 3 shows a three layer semiconductor diode in plan view.
FIG. 3b shows the same three layer diode from a side view.
Figure 3B:
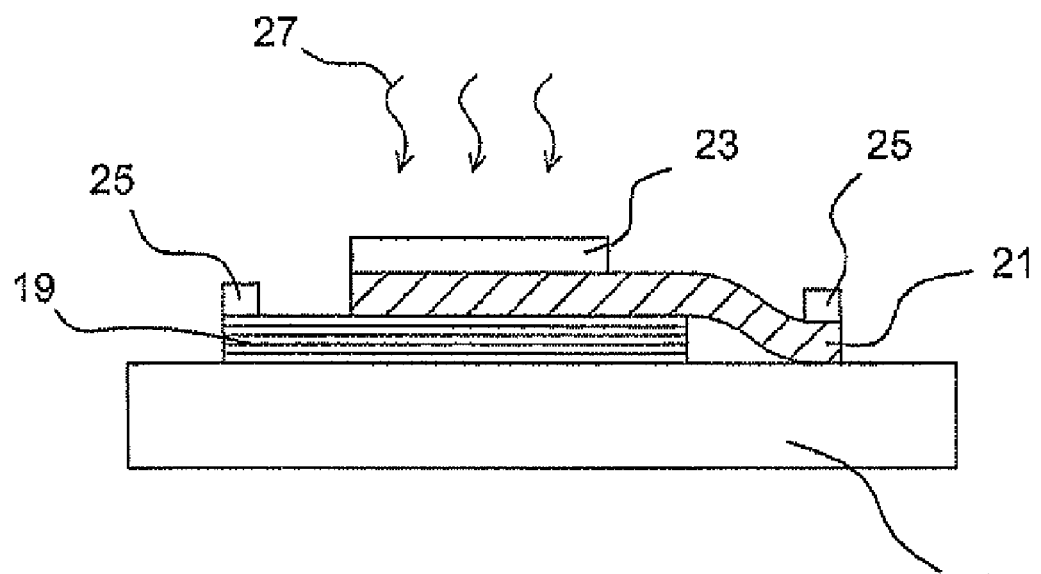

FIGS. 3a and 3b show a lateral configuration of a multilayer radiation detection device.

On substrate 17 there is a first metal oxide layer 19, a second metal oxide layer 21 and a third metal oxide layer 23. The metal oxide layers are in the form of rectangular strips of material which, at one of opposed respective end regions thereof, overlie one another such that the first layer 19 is in contact with the substrate 17, the second layer 21 is on top of the first layer 19 and the third layer 23 is uppermost, so as thereby to provide a laminate. At the other of the opposed respective end regions of end strips 19, 21, 23, the strips are not in register with one another and overlie only the substrate 17, as to provide respective exposed longitudinal ends of the strips, to each of which a respective contact 25 is applied. As shown in FIG. 3b, respective ends of strips 21 and 23 lie below their respective horizontal planes and are in contact with substrate 17. In use, a DC current is applied to the device and incident radiation 27 generates charge carriers. The detection device detects the change in the observed current due to the radiation.

In the prior art the three layers comprise silicon and germanium based materials. In embodiments of the present invention the layers are formed, as previously described, from metal oxides, for example, transition metal oxides. The ordering of the three layers is such that n-type and p-type conductors alternate, i.e. either n-p-n or p-n-p.

Figure 4A:
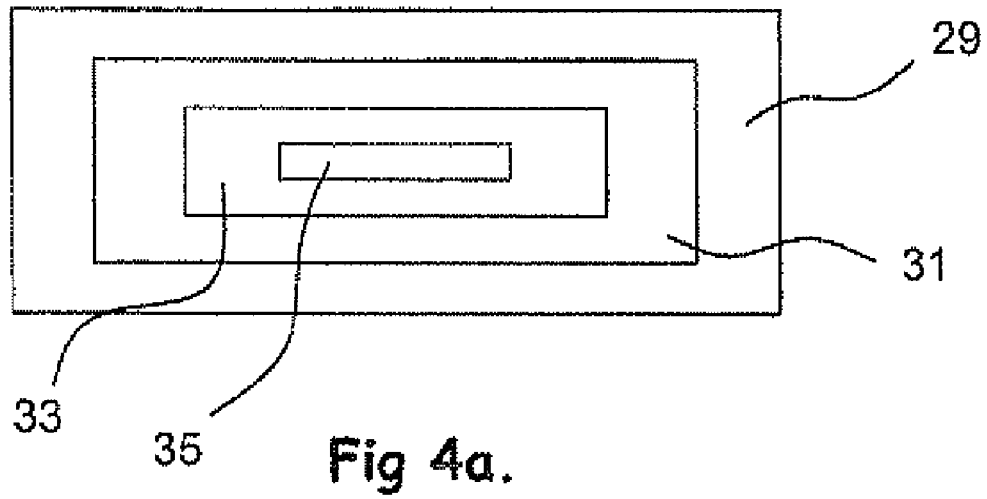
FIG. 4 shows a two layer semiconductor diode device in plan view.
FIG. 4b shows the same device from a side view.
Figure 4B:
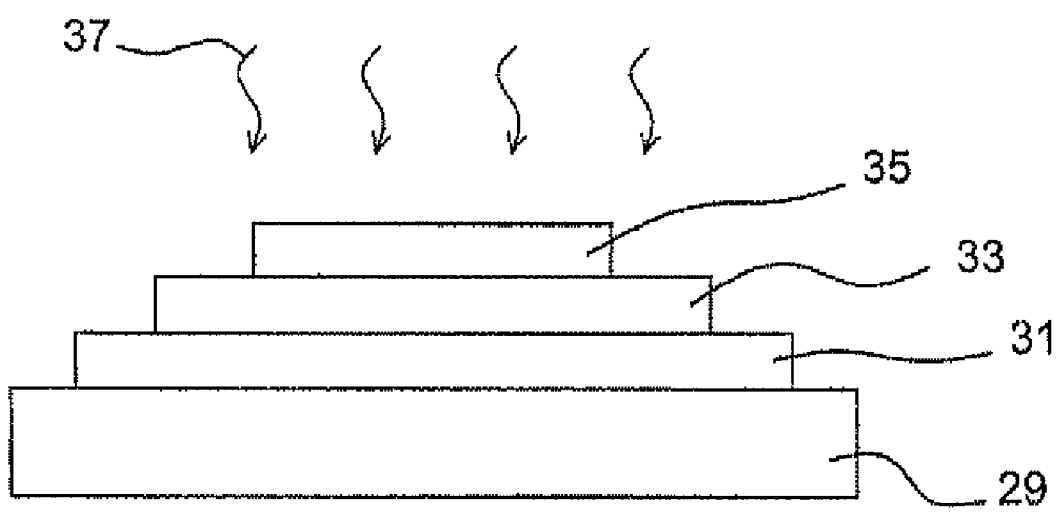

FIGS. 4a and 4b show a dual layer radiation detection device having a transverse configuration. A conducting substrate 29 supports a first layer 31 on top of which is formed a second layer 33 and finally contact 35.

A DC current is applied between contact 35 and substrate 29. Incident radiation 37 generates charge carriers within the device which alters the current flow that is observed in an external circuit.

In the prior art, layers 31 and 33 would be formed from silicon and germanium. In embodiments of the present invention the layers may be formed from partially oxidised metal-containing particles, for example transition metal oxides, and may be deposited in the order n-p or p-n.

Figure 6:
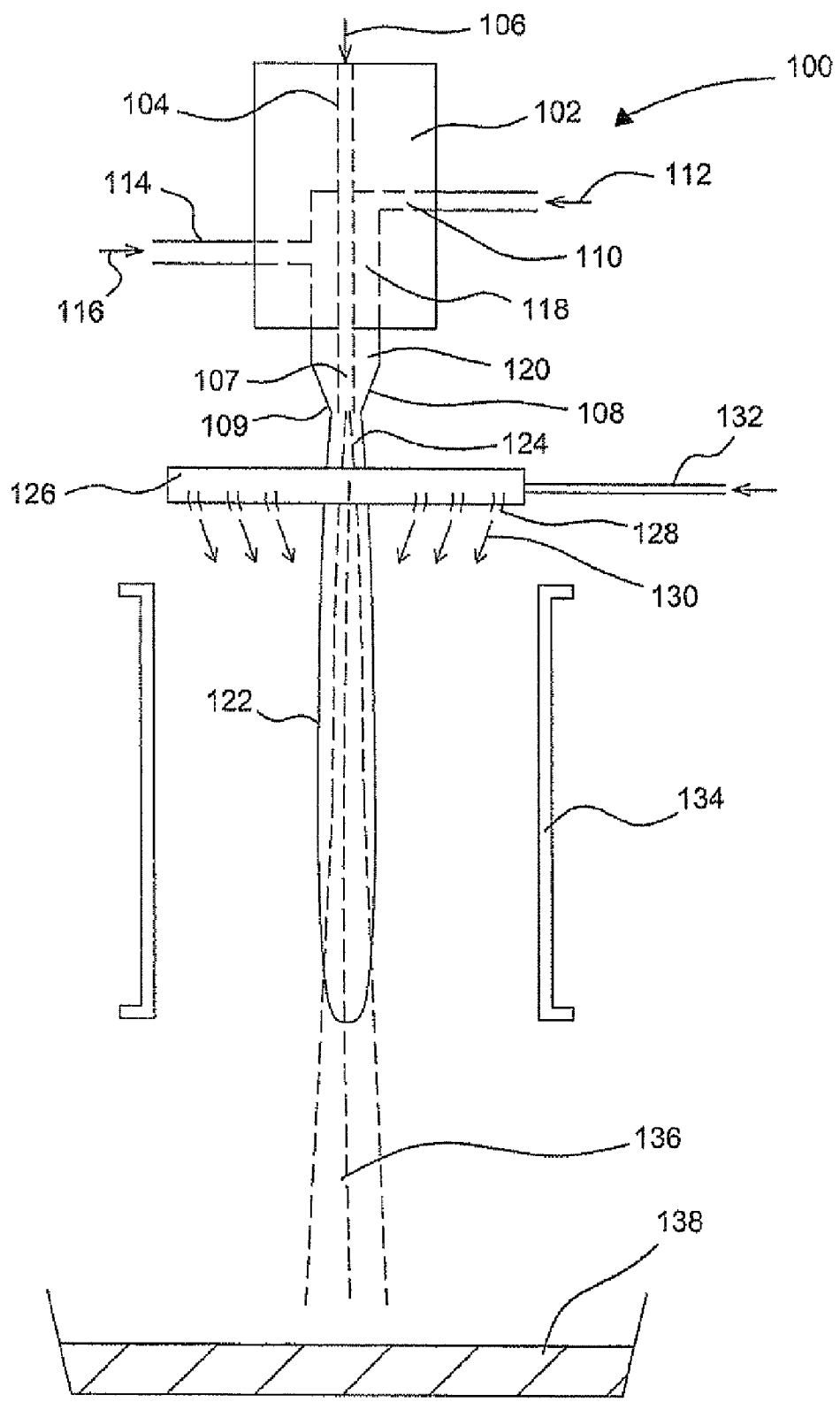
FIG. 6 shows a schematic representation of apparatus for preoxidising metal-containing particles in accordance with the first aspect of the invention.
Figure 7:
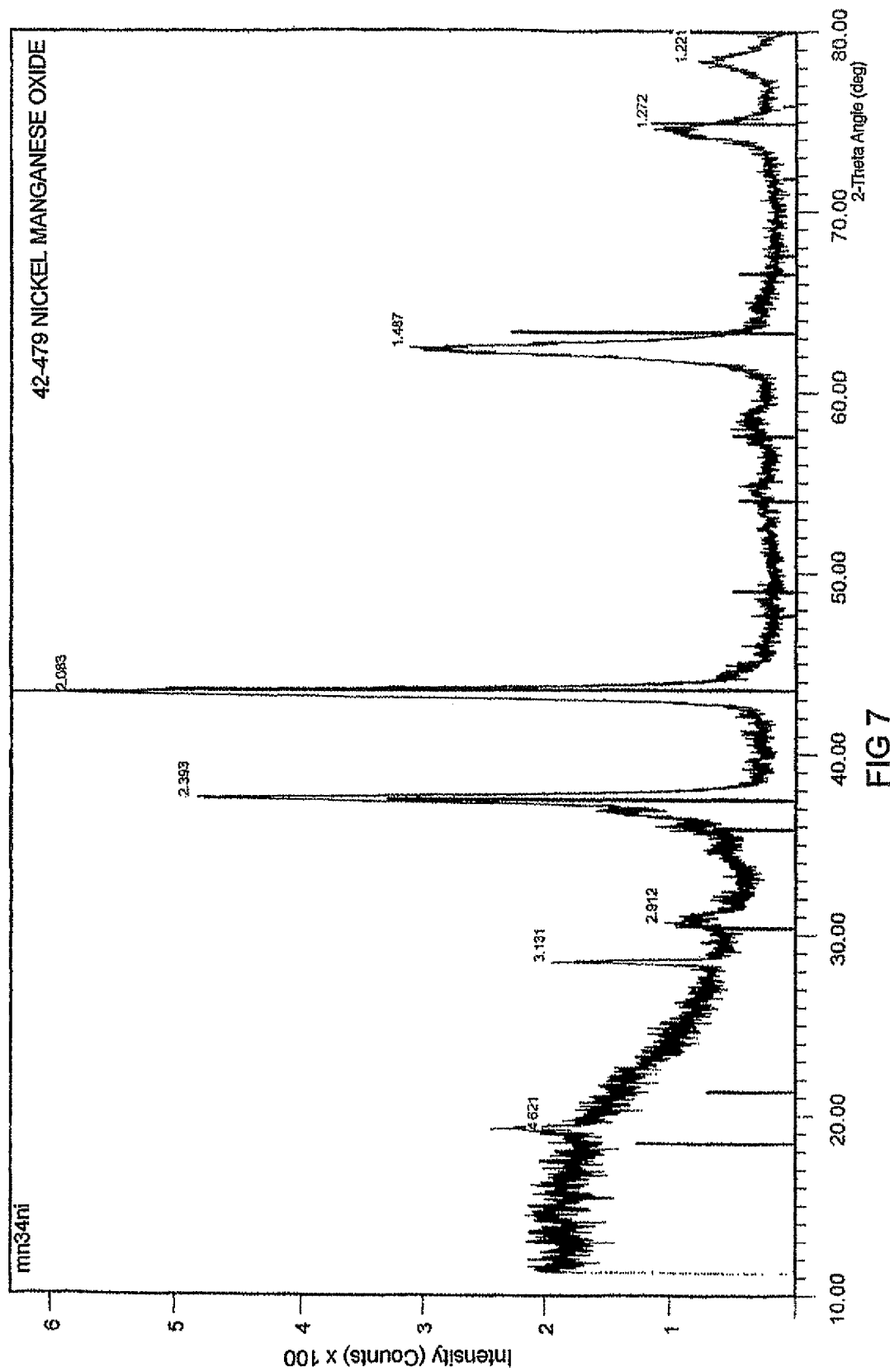
FIGS. 7-20 are respective X-ray diffraction (XRD) spectra for partially oxidised metal-containing particles embodying the invention.
Figure 8:
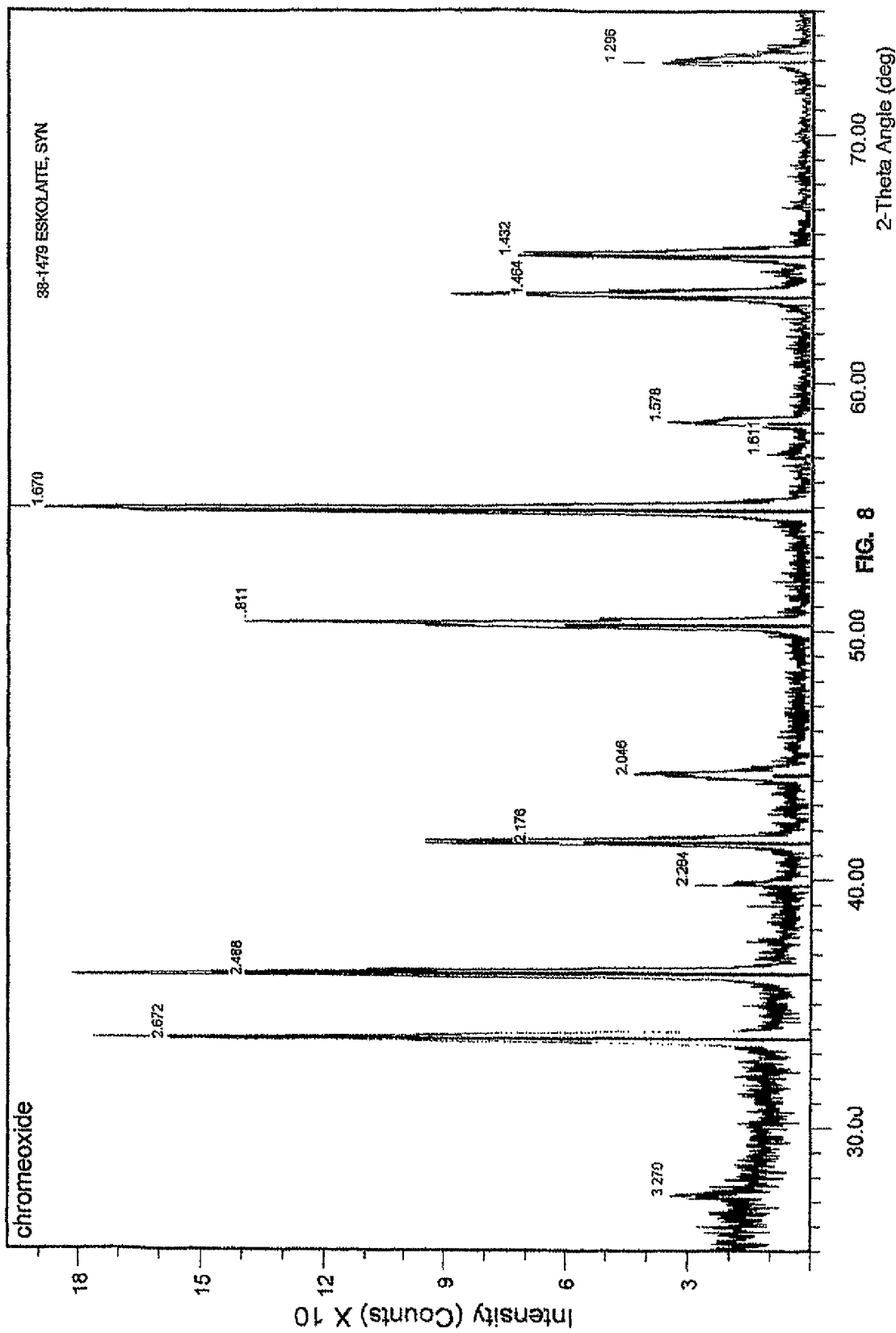
Figure 9:
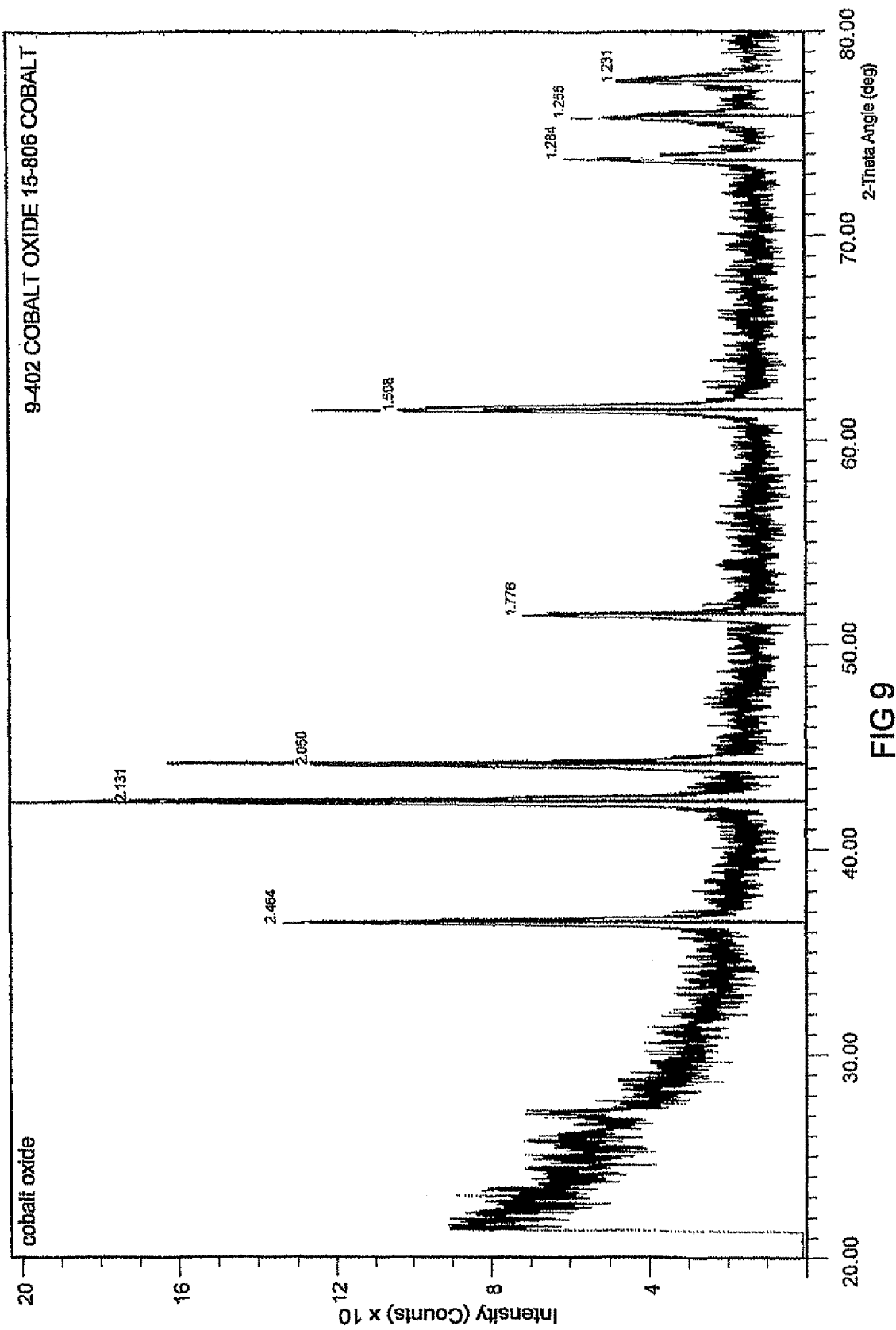
Figure 10:
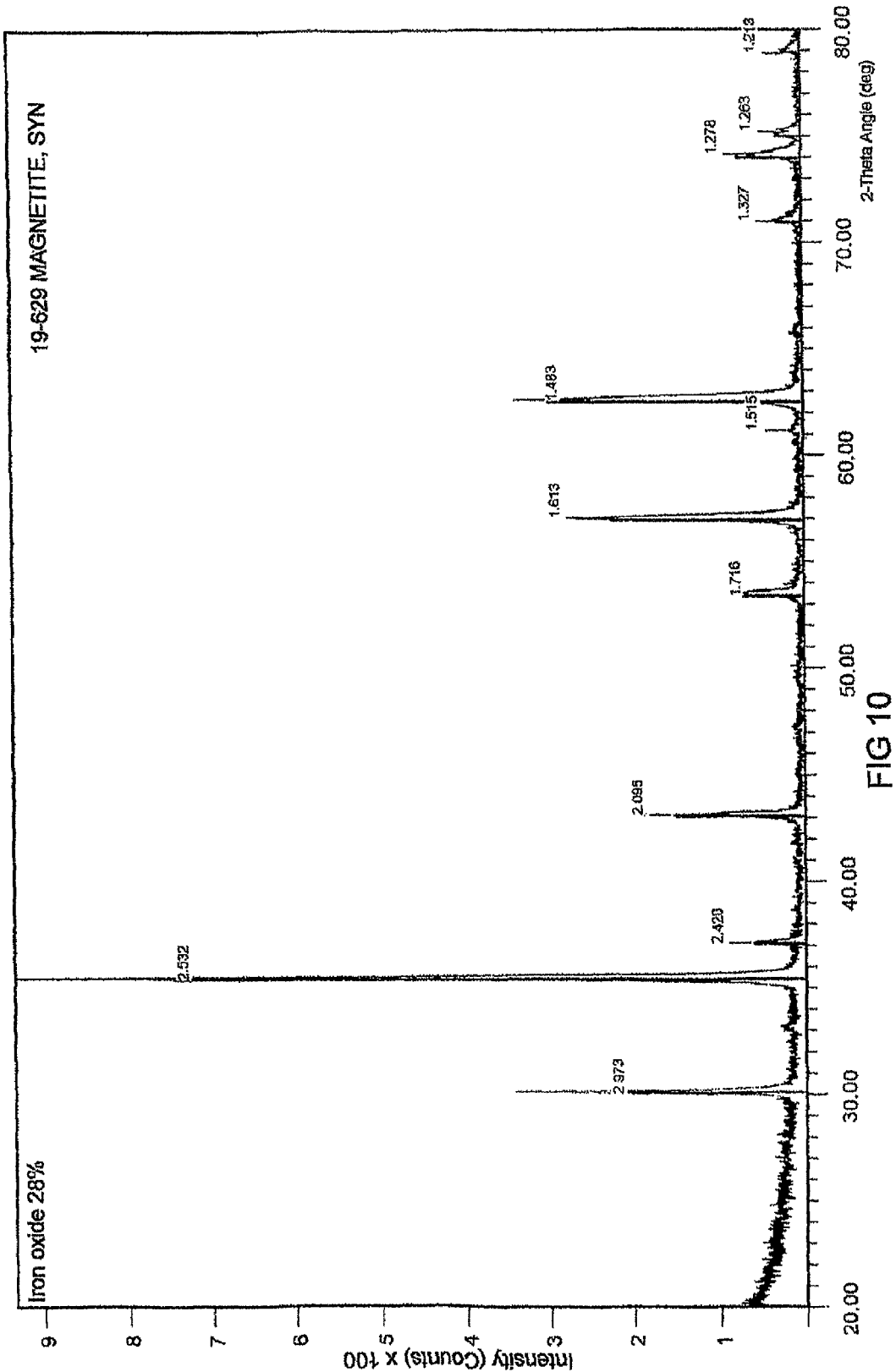
Figure 11:
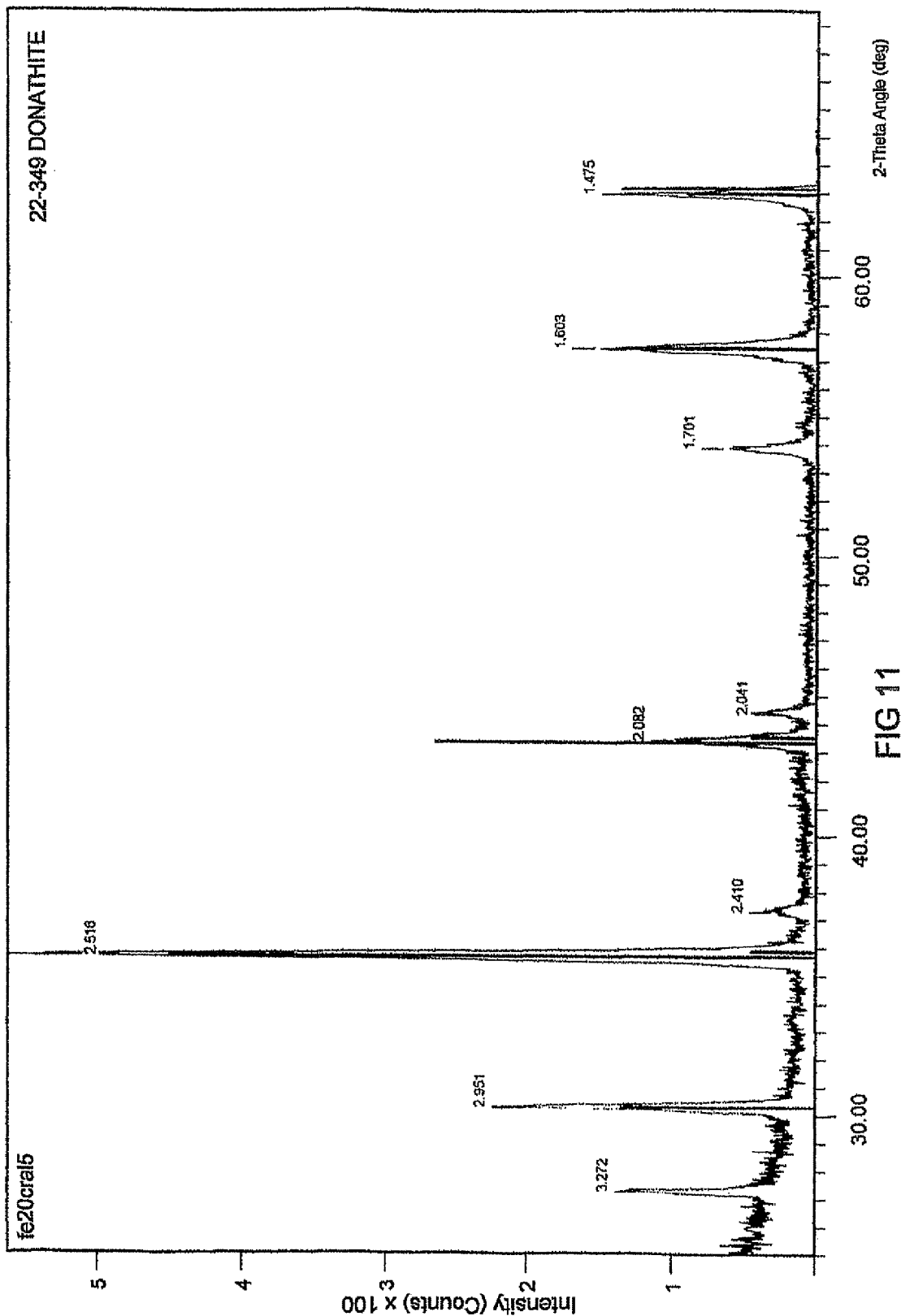
Figure 12:
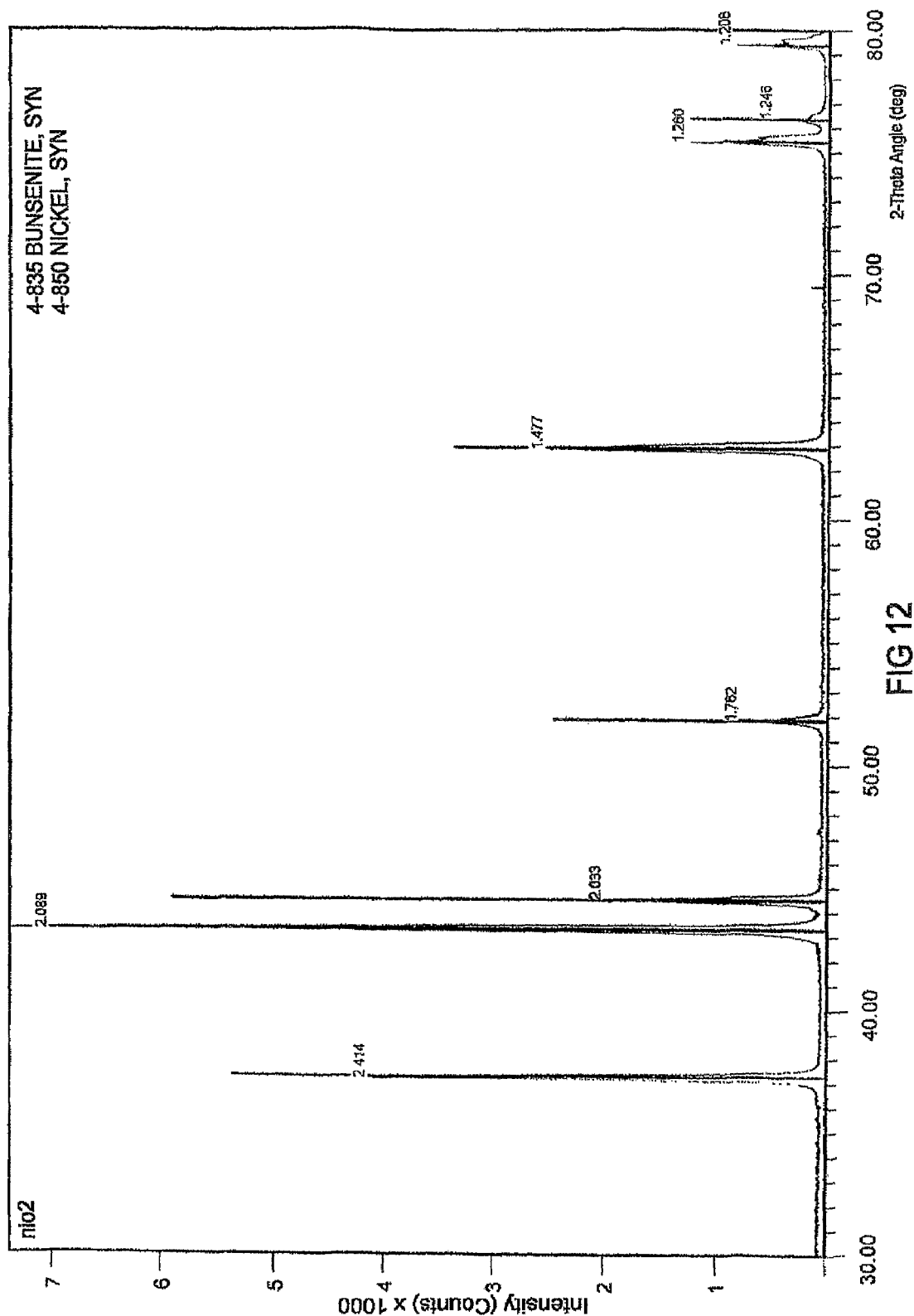
Figure 13:
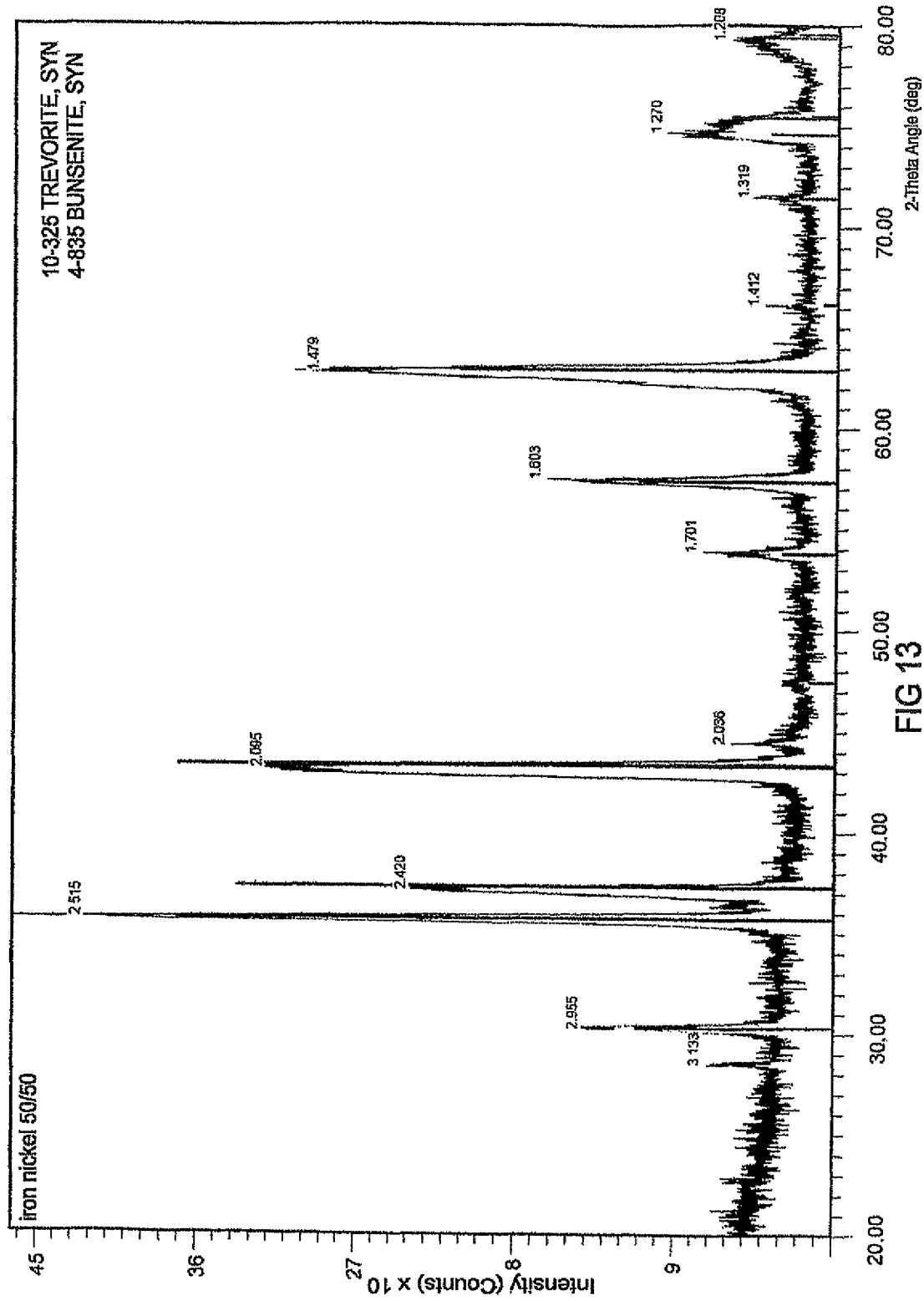
Figure 14:
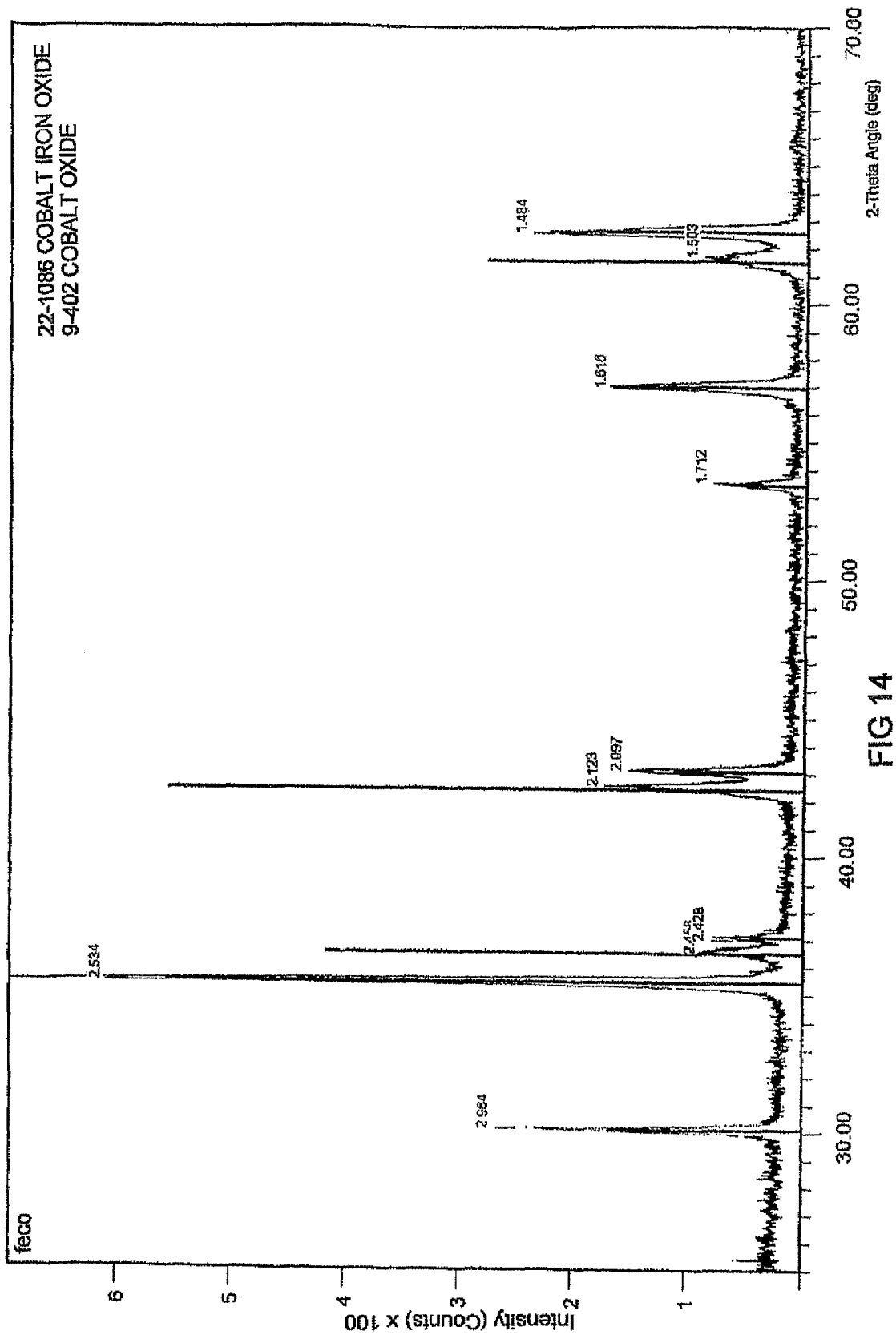
Figure 15:
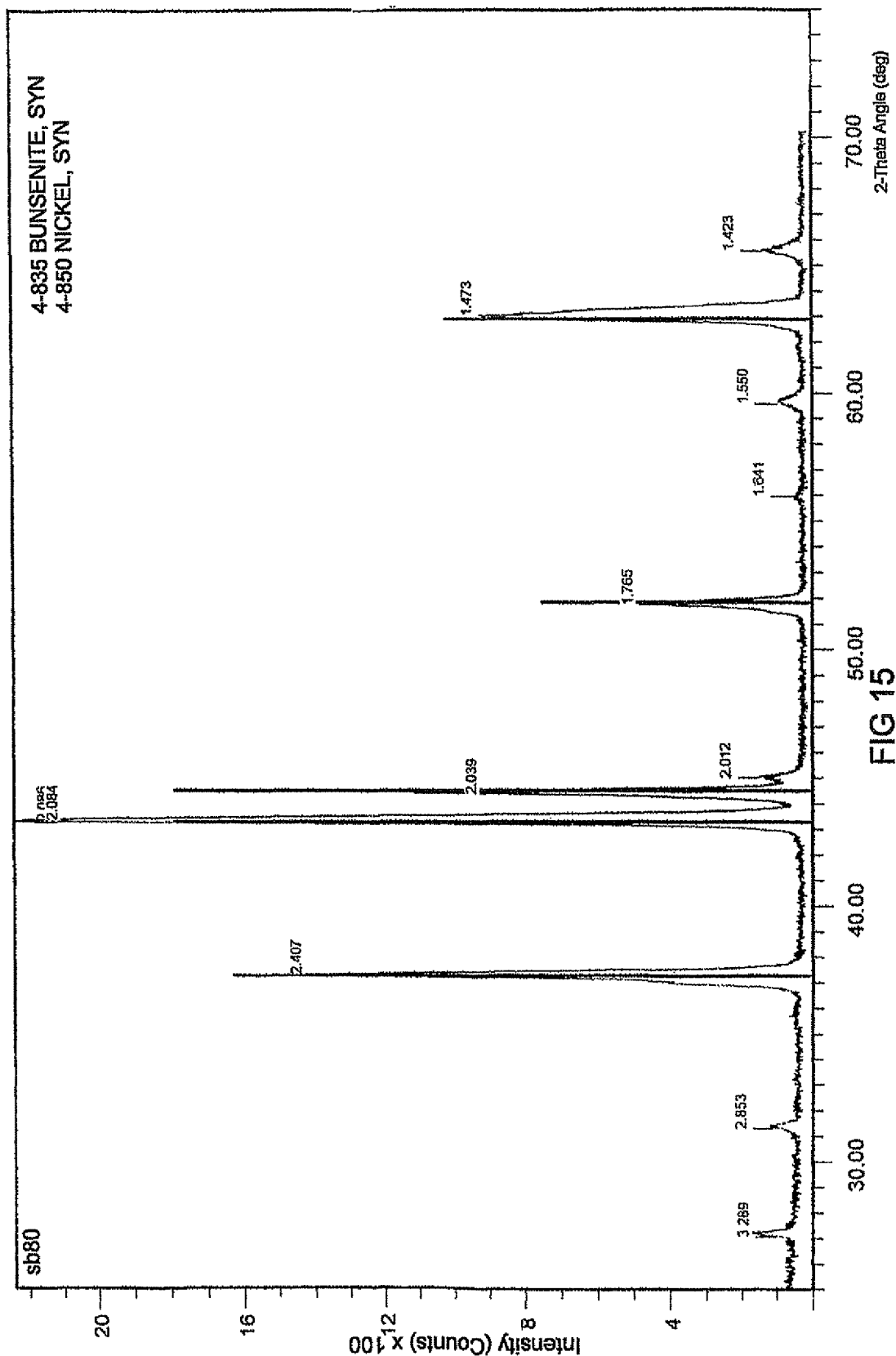
Figure 16:
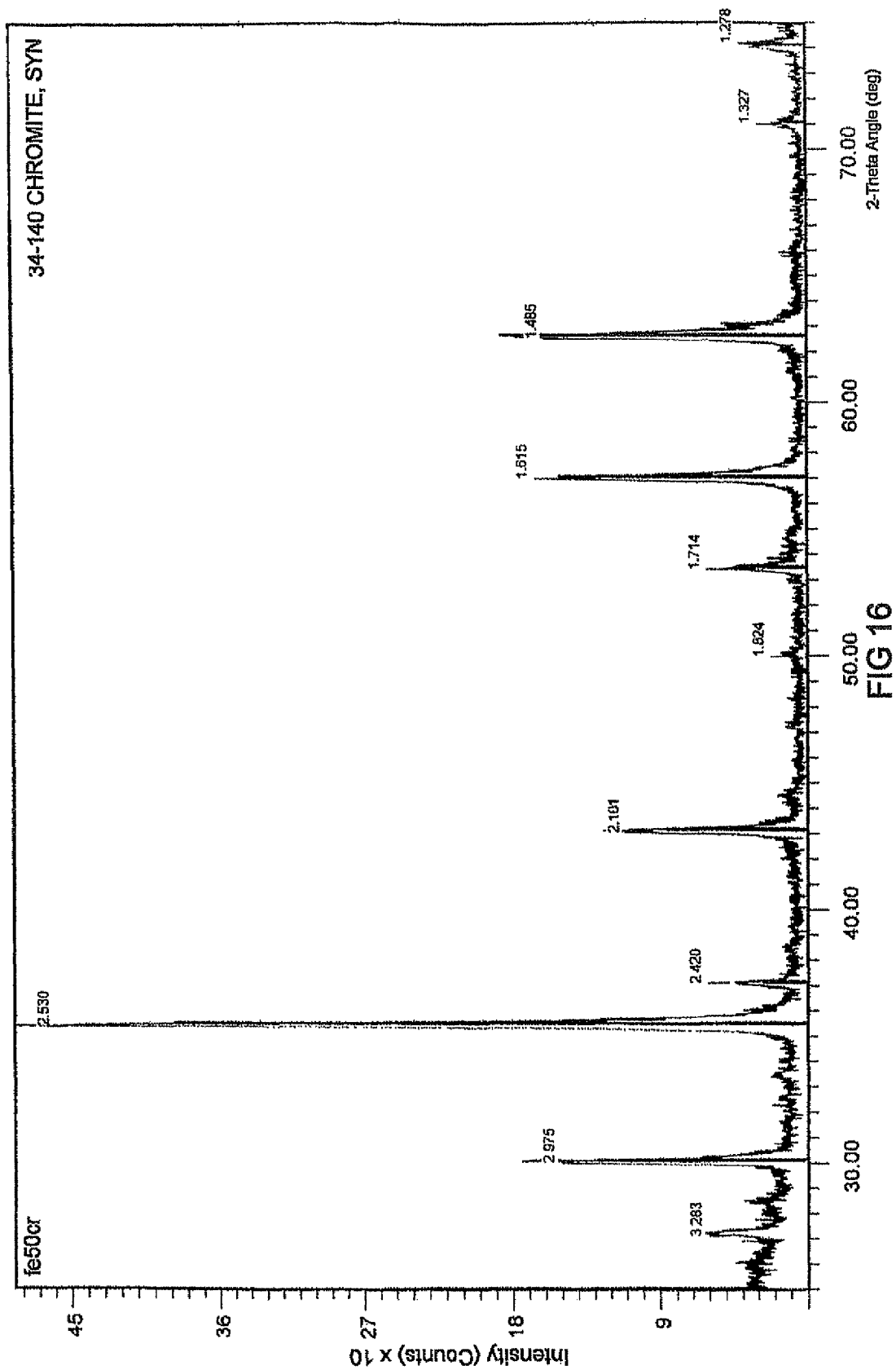
Figure 17:
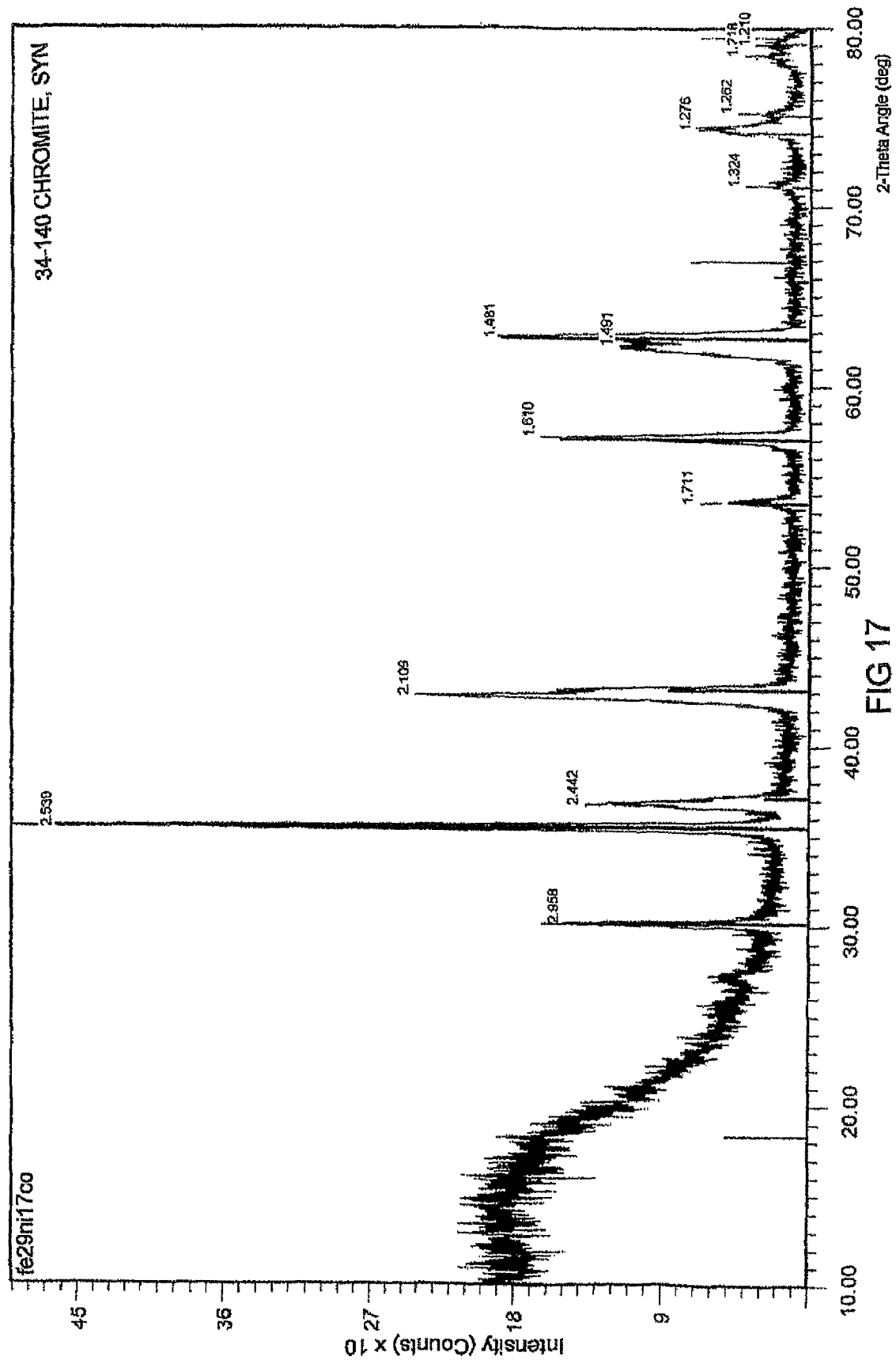
Figure 18:
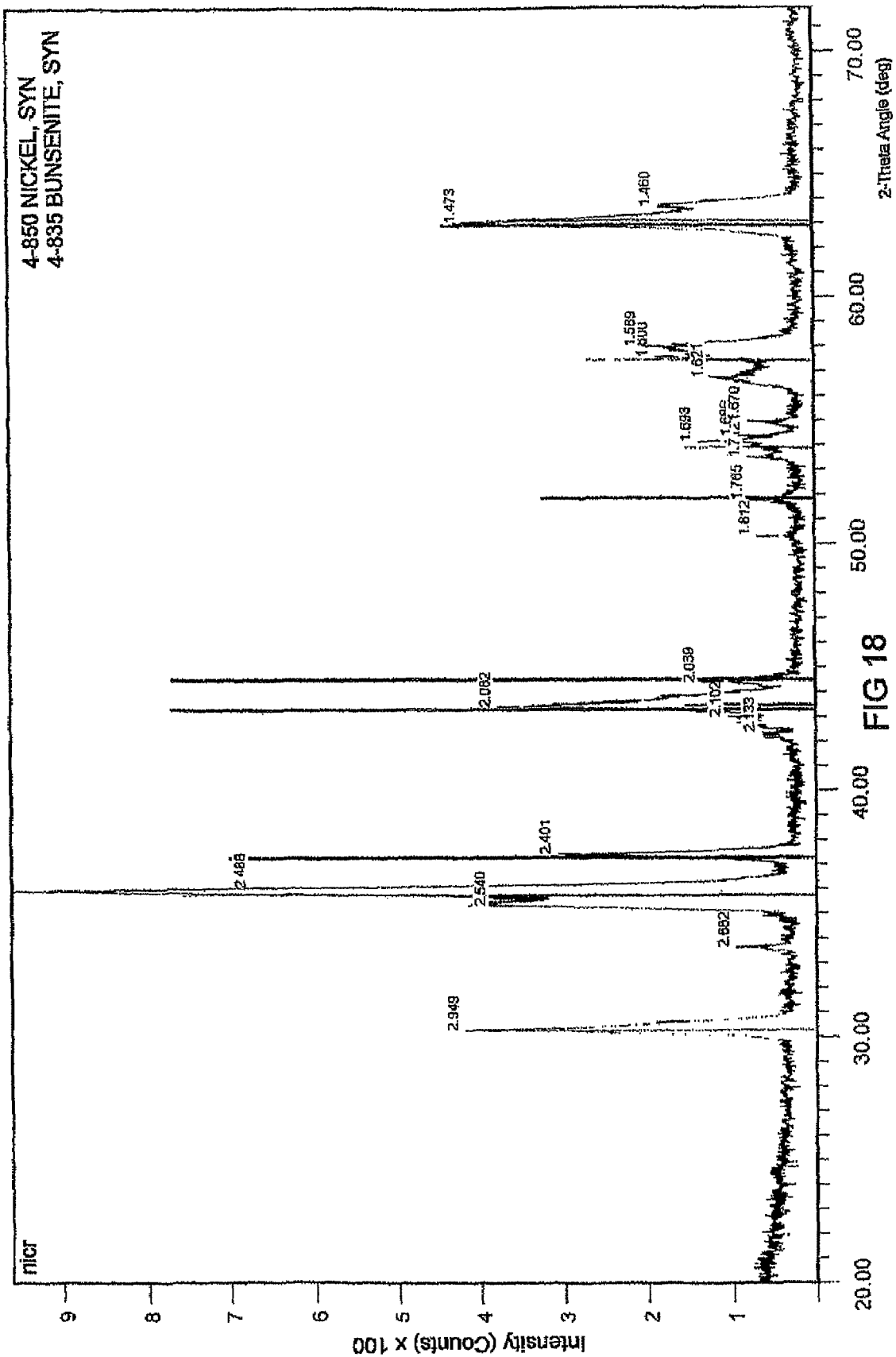
Figure 19:
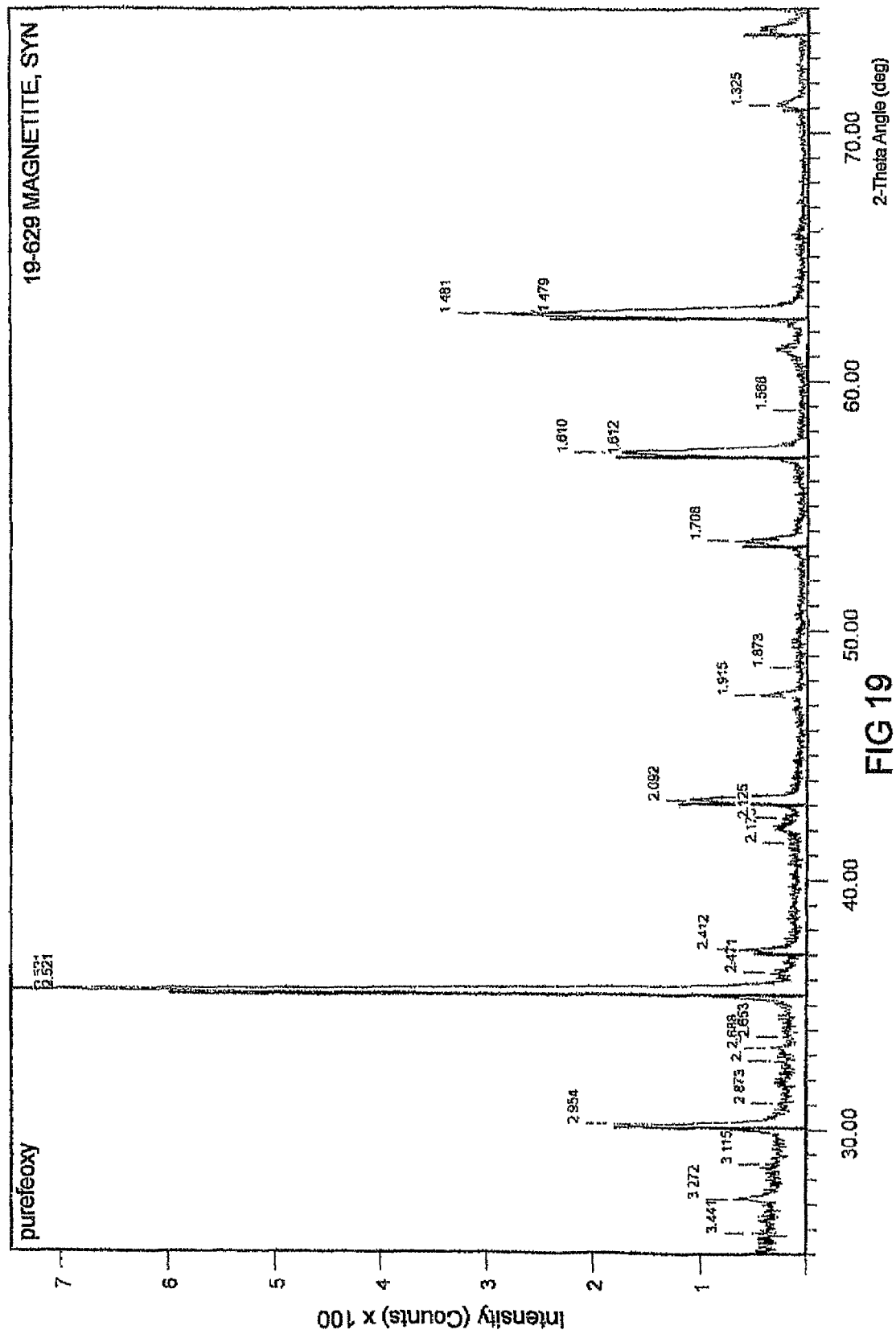
Figure 20:
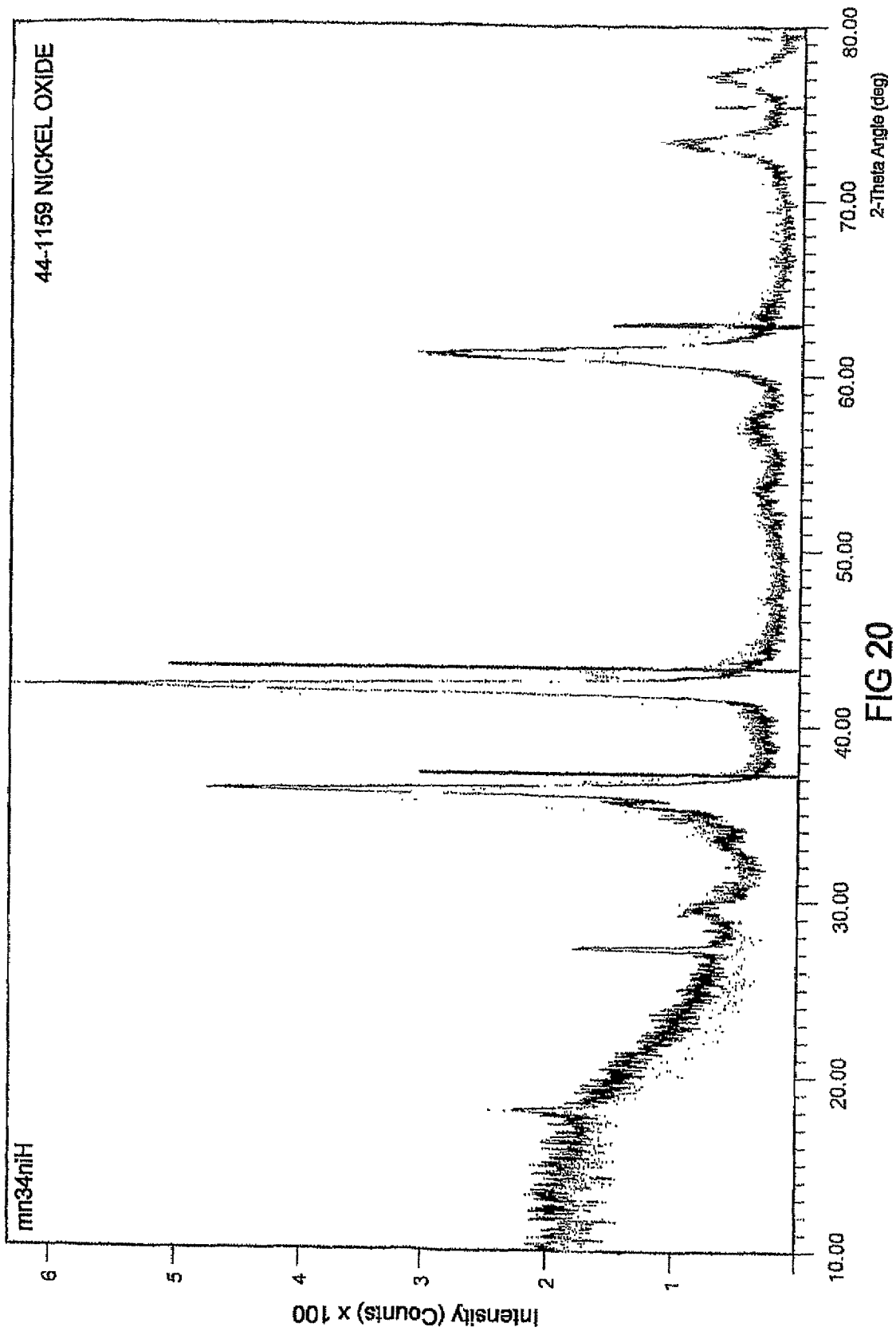

Thus, referring to FIG. 6, this shows a schematic representation of apparatus for preoxidising metal-containing particles in accordance with the first aspect of the invention.

Oxidation apparatus 100 includes burner unit 102 which has a powder inlet channel 104 for delivering a flow of powder 106 to an inner part 107 of the nozzle 108 where it will be oxidised in a flame.

Burner unit 100 also includes oxidising gas inlet 110 for receiving a flow of oxidising gas 112, and fuel gas inlet 114 for receiving a flow of fuel gas 116. The oxidising gas and fuel gas are mixed in the burner unit in mixing chamber 118. The mixed gases then pass into an outer part 120 of nozzle 108.

The gases are ignited as they exit the nozzle 108 and produce a flame 122, the hottest part of which 124 is just below the nozzle 108 (e.g. 10 mm below the nozzle).

The powder is partially oxidised as it exits the nozzle and enters the flame, passing through the hottest part of the flame 124.

Below the burner unit there is a ring 126 having a plurality (e.g. 5) of small nozzles 128 which direct a flow of oxygen 130 to the outer part of the flame 122. The oxygen is supplied to the ring via inlet 132. The oxygen "shroud" thus formed has been found to increase the extent of oxidation.

Below the ring 126 is a high temperature glass tube 134 which surrounds the flame and is concentric with it. The presence of a tube of this sort has bee found to increase the extent of oxidation.

The oxygen 'shroud' and glass tube can have the effect of generating vortices at the edge of the flame. This can increase the extent of oxidation by encouraging mixing of the gases.

The stream of partially oxidised, partially molten particles 136 enters the flame and falls into a water quench collector 138.

The partially oxidised particles can be recovered by filtering and drying.

The following (Process) Examples and (Performance) Experiments illustrate the principles underlying the present invention.

Example 1

A selection of cheap, readily available, commercially manufactured transition metal alloy powders were obtained and oxidised by a method in accordance with the first aspect of the invention in which the powders were passed through an oxygen/acetylene flame and, after oxidation, collected in water and then dried.

In this method, carried out using apparatus of FIG. 6, the conductive gases were fed at respective rates of 40 l/min (oxygen) and 16 l/min (acetylene), these respective flow rates giving a stoichiometric ratio of oxygen:acetylene, this providing the hottest flame. The powder was fed to the flame at a feed rate of 15-20 g/min and was entrained in a stream of oxygen flowing at a rate of 10-12 l/min. Variations in the oxygen flow rates may be allowed to occur as the volume of powder in the powder feed equipment reduces and variation in the powder feed rate may also be made for variations in density of different metal/alloy powders. An oxygen shroud was provided by passing a stream of oxygen through nozzles 128 at a feed rate of 10-20 l/min. The distance from entry into the flame of the powder at nozzle tip 109 to the water surface was 600 mm.

Before starting the oxidation process the powder flow rate was measured by allowing the oxygen/metal particle stream to fall into a collecting vessel for 60 seconds, and the weight collected gave the powder flow rate for a fixed powder feed unit setting.

Details of the powders employed in Experiments 1-5 and the resultant products produced by processes embodying a first aspect of the invention (oxidation) are shown in Table 3.

As to the powder particle size ranges given in Table 3, these are measured using a Malvern laser particle size analyser, which measures the maximum and minimum size of particles, indicated respectively as −(maximum size) and +(minimum size). Although not given in Table 3, for all samples, the minimum particle size was +1 µm. The respective maximum sizes were given in Table 3.

Experiment 1

Evidence of Semi-Conductivity

The oxides were flame sprayed onto high temperature borax glass in the form of rectangular tracks 150 mm long by 50 mm wide, to which silver contacts were applied at each end.

The oxide samples were then successively put into a furnace and heated up to 600° C.-650° C., measurements of the track resistances being taken at 10° C. intervals.

The results obtained showed decreasing resistance with increasing temperature and when plotted in graph form showed the logarithmic relationship which is characteristic of semi-conductivity.

A second series of graphs were produced in which Log n (conductance) was plotted against $1/T°$ C., the slopes of which showed that the oxides had variable activation energy levels and were in fact wide band gap semi-conductors.

A simple thermal test indicated that the powder samples were all 'n' type.

Six of the oxides were flame sprayed onto unglazed ceramic tiles, which had previously been flame sprayed with a layer of metallic copper, again as tracks 150 mm long and 50 mm wide. The top surface of the oxide tracks were painted with silver paint in 10 mm×10 mm squares to act as contact areas, to which wire contacts were made.

These oxide tracks were then tested on a Daresbury Synchrotron by exposing them to extremely high intensity X-ray radiation. Two of the oxide tracks reacted to the incidence of X-rays generating charge carriers, evidence of which was provided by an increase in current flowing in an external circuit under an applied voltage, thus demonstrating that they were in fact wide band gap radiation detectors.

Experiment 2

Development of 'p' Type Oxides

Several alloy powders and also powders of pure iron, chrome, cobalt and nickel were obtained and oxidised by a method in accordance with the first aspect of the invention as described in Experiment 1.

Samples of these oxides were flame sprayed onto 25 mm square pieces of unglazed tiles and subjected to the Hall Effect test. The results obtained showed that the single metal oxides of iron, chrome, nickel and cobalt were semi-conductive and also exhibited 'p' type conduction as did the Si—Al; Ag—Cu; and Fe—Ni—Co alloys.

Experiment 3

Development of Diodes

Six semi-conductive transition metal oxides have been identified, some being of 'n' type, and some being of 'p' type, conduction.

Four oxides which demonstrated the strongest 'n' and 'p' characteristics in the Hall Effect tests were chosen as diode combinations. These were metal oxides of the following: (66% Ni-34% Mn)-'n' type; chromium-'p' type; cobalt-'p' type; and (92% Si-8% Al)-'p' type.

Diodes were produced onto 3" square pieces of unglazed tile by:

(i) Flame spraying a layer of copper onto the ceramic to act as an electrical contact.

(ii) Flame spraying a layer of 'n' type (66% Ni-34% Mn) oxide 70 mm diameter and 200 μm thick onto the copper.

(iii) Flame spraying one of the 'p' type oxides 50 mm diameter onto the 'n' type oxide.

(iv) Applying a thin layer of silver paint, 10 mm diameter, to the upper surface of the 'p' type oxide and when this had dried, soldering a wire contact to the silver paint area.

Using this method, three separate diodes were produced: (66% Ni-34% Mn)/Cr; (66% Ni-34% Mn)/(95% Si-8% Al); and (66% Ni-34% Mn)/Co.

Diodes were then attached to a direct current power supply and subjected to forward and reverse bias voltages.

The voltage/current curves are identical to those given in standard text books for silicon and germanium diodes, thus showing that the devices are behaving as diodes.

The (66% Ni-34% Mn)/chromium and (66% Ni-34% Mn)/(92% Si-8% Al) combinations are typical 'p'/'n' diodes, and the (66% Ni-34% Mn)/cobalt typical of an avalanche diode.

A further oxide combination, that of (66% Ni-34% Mn)/iron, was produced. Again, this produced typical 'p'/'n' diode characteristics.

Experiment 4

Evidence of Consistency

The (66% Ni-34% Mn)/Fe diode was subjected to a reverse and forward bias voltage/current test at a series of different temperatures ranging from 20° C. to 100° C. and the resulting curves are identical to those for a silicon diode tested over the same range, demonstrating decreasing bias voltage with increasing temperature.

Additionally, a second identical diode was subjected to three cycles over the same forward and reverse bias voltages and produced identical voltage/current curves, demonstrating consistency of operation.

Experiment 5

Test of Diode on Exposure to X-Ray Radiation

Objective

The objective of the test was to determine the behavioural characteristics of a diode produced by successive respective processes in accordance with the first (oxidation) and second (heating and deposition) aspects of the invention when exposed to X-ray radiation under reversed bias voltages.

Sample Diode

The sample consisted of a 50 mm square of unglazed ceramic, 6 mm thick, coated on one side with a flame sprayed layer of silver copper alloy 30 μm thick.

A layer of 'n' type oxide of Mn(34%)/Ni(66%) alloy, 160 μm thick and 35 mm dia was flame sprayed onto the conductive silver copper alloy. A second layer of 'p' type oxide of Cr(99.5%), 60 μms thick and 15 mm dia was flame sprayed onto the 'n' type oxide, both deposits being roughly coaxial.

Electrical contact to the sprayed Ag/Cu layer was made by soldering in place a piece of thin copper wire and on the 'p' type oxide by applying silver paint to the area 10 mm dia and when this was dry, soldering onto the silver area a second thin copper wire, such that on the application of an EMF current flowed through both oxide layers from top to bottom contact.

Equipment Configuration

The sample was fixed at the outlet port of an X-ray source normally utilised for XRD analysis and aligned such that the silver contact area covered the X-ray output aperture, but was some 30 mm from it.

The two diode contacts were achieved via crocodile clips and leads to a 15 volt DC power source with a current limitation of 3.0 amps and the location of the DC source within the X-ray cabinet was so arranged as to be completely shielded from any radiation.

Experimental Procedure

The X-ray source was switched on and set to operate at normal power levels of 40 KV and 20 milliamps, being left for some 15 minutes to settle down.

The ambient temperature was noted at 20° C.

Successive reverse bias voltages were applied to the diode in the range of −0.5V to −2.0V in 0.25 volt steps. An upper limit of −2.0 volts was chosen as this was approaching the breakdown voltage of −2.7/−3.0 volts, determined previously on an identical sample and it was seen to be of no advantage to trigger avalanche conditions.

The successively increasing reverse bias voltages were applied to the diode and the initial current passing through the diode and allowed to settle down before being recorded.

When the initial currents were steady the X-ray shutter was opened and the CuK alpha X-ray beam allowed to impinge onto the silver contact area of the top 'p' type oxide layer and the change in current flow and the time required for the change accurately recorded. The data observed is set out in Table 1.

TABLE 1

Results

| Applied Voltage Volts | Mode | Recorded milli amps Initial | Current Exposed | Reaction Time |
|---|---|---|---|---|
| −0.5 | Reverse | 3 mA | 6 mA | Immediate |
| −0.75 | Reverse | 9 mA | 12 mA | Immediate |
| −1.00 | Reverse | 16 mA | 24 mA | Immediate |
| −1.25 | Reverse | 40 mA | 35 mA | 30 secs |
| −1.50 | Reverse | 107 mA | 115 mA | 16 secs |
| −2.00 | Reverse | 300 mA | 310 mA | Immediate |

Figure 5:
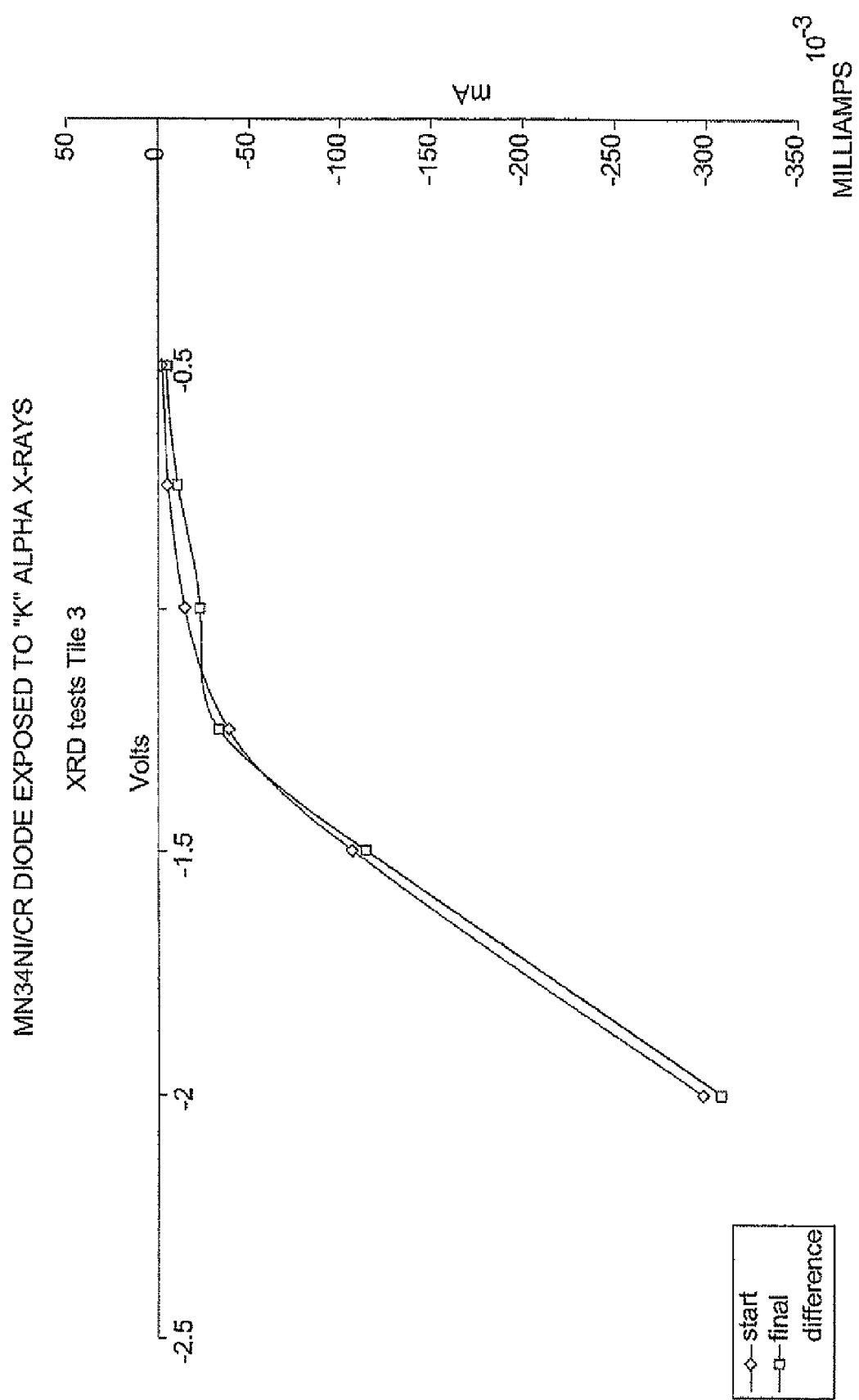
FIG. 5 shows a graphical representation of the change in current due to irradiation by X-rays of a diode subjected to reverse bias voltages.

A graph of these results is shown in FIG. 5.

Comments on Results

The current flowing showed an immediate increase in value on exposure to X-ray radiation at bias voltage of −0.5, −0.75, −1.0 and −2.0.

The erroneous results for −1.25 and −1.50 volts were caused by the crocodile clips coming into contact and shorting due to vibration when the X-ray cabinet doors were opened and closed during voltage adjustments.

Unfortunately it was not possible to repeat the trial within the time frame available. The diode showed no change of properties as a result of being tested.

It can be observed however that the diode reacted positively to the effects of X-ray irradiation, giving a current increase in milliamp terms, as against the normal microamp or nanoamp results obtained from conventional devices.

Calculation of Efficiency/Sensitivity

The following is an attempt to calculate the efficiency of the diode from information supplied by the makers of the XRD equipment, which has been extremely difficult to obtain, and other sources.

Power supply to tube: 40 KV×20 milliamps=800 watts
Operational efficiency of tube, at best 1%, as stated by manufacturers.

Output energy from tube=8 watts.

The copper K alpha radiation is only 10% of the available beam energy at a wavelength of 1.4 angstroms, the rest being dissipated.

So max energy falling onto sample=0.80 watts. Conversion factor for photons/sec at Cu K alpha wavelength, 8 KeV, is:

1 milliwatt=7.8 $10^{11}$ photons/sec

For a beam output of 0.80 watts (800 milliwatts) the photon flux falling onto the sample is: $800 \times 7.8 \times 10^{11} = 6.24 \times 10^{14}$ photons/sec which can be considered as energy in.

If the current increase is considered as energy out at a conversion rate of 1 milliamp=$6.24 \times 10^{15}$ electrons it is possible to tabulate the results as shown in Table 2 below

TABLE 2

| Energy in Photon flux Photons/sec | Energy Increase in milli amps | Out Charge carriers generated | Electrons Generated per Photon |
|---|---|---|---|
| $6.24 \times 10^{14}$ | 3 | $18.7 \times 10^{15}$ | 30 |
| $6.24 \times 10^{14}$ | 3 | $18.7 \times 10^{15}$ | 30 |
| $6.24 \times 10^{14}$ | 8 | $49.9 \times 10^{15}$ | 80 |
| $6.24 \times 10^{14}$ | 10 | $62.4 \times 10^{15}$ | 100 |

These results show that the diode tested is a very effective energy conversion device. However, it is believed that other factors must be taken into consideration, listed as follows.

There are doubts as to the accuracy of the information provided by the equipment manufacturers. Firstly, with reference to the operating efficiency of the tube, this is given as a maximum of 1%. However, a small increase in this value would have a marked effect on the results. Similarly, the assumption is made that only 10% of the emitted X-rays are Cu K alpha and that only these had any effect on the diode. However, if in fact the diode responded to a much larger area of the spectra than just the Cu K alpha, then this would also affect the results. In addition, it was not possible to determine what percentage of the photon flux was absorbed by the sample.

Alternatively, it is possible to explain these results in terms of the oxide characteristics.

Previous empirical tests on the Synchrotron line, using photon flux densities of $10^{15}$ photons/sec, with single layers of 'n' type oxides having the same thicknesses as the test sample, have shown that these single layer devices generate similar levels of increased current flow. It is assumed that the energy conversion mechanism in this case is the photo-conductive effect.

It is therefore feasible that those volumes of the 'n' and 'p' type oxides outside the depletion phase at their juncture develop charge carriers due to the photo-conductive effect and that charge carriers are generated in the depletion phase due to the photo-electric effect and that these two effects are cumulative, producing very efficient/sensitive devices.

TABLE 3

T.M. OXIDE DATA

| Sample | Metal or Alloy | Composition by weight | Powder Particle Size Range | % Oxidation by Weight | Conduction Type 'n'/'p' | Oxidised Particle Size Range Mean | Resistance H = High L = Low | Optimum Mean Particle Size after Oxidation |
|---|---|---|---|---|---|---|---|---|
| A | Mn34Ni | 34% Mn 66 Ni % | −38 μm | 18% | 'n' | 30 μm | H | 29 μm |
| B | Chromium | 99.5% Cr | −45 μm | 21% | 'p' |  | H | 22 μm |
| C | Cobalt | 99.5% Co | −80 μm | 5% | 'p' | 84 μm | L | 28 μm |
| F | Iron | 99.5% Fe | −38 μm | 22% | 'p' | 43 μm | H | 28 μm |
| G | Iron | 99.5% Fe | −38 μm | 21% | 'p' | 40 μm | H | 28 μm |
| H | Mn34Ni | 34% Mn 66% Ni | −38 μm | 18.3% | 'n' | 31 μm | H | 29 μm |
| I | SC821 | 8.2% Ag 91.8% Cu | −45 μm | 8% | 'p' | 64 μm | L | 21 μm |
| J | Al 66 | 66% Al 34% Ni | −75 μm | 6% | 'n' | 58 μm | L | 21 μm |
| K | Fe20Cr5AL | 75% Fe 20% Cr 5% Al | −38 μm | 15% | 'n' | 20 μm | L | 20 μm |
| L | Nickel | 99.5% Ni | −38 μm | 12% | 'n' | 43 μm | L | 21 μm |
| M | Fe50Ni | 50% Fe 50% Ni | −38 μm | 13% | 'n' | 31 μm |  | 21 μm |
| N | Al/Cu | 91.6% Cu 8.4% Al | −80 μm | 4% | 'n' | 53 μm | L | 21 μm |
| O | FeCo | 50% Fe 50% Co | −38 μm | 15% | 'n' | 34 μm |  | 22 μm |
| P | SB80 | 95% Fe 5% Al | −38 μm | 12% | 'n' | 36 μm | H | 22 μm |
| Q | FeCr | 50% Fe 50% Cr | −38 μm | 11% | 'n' | 25 μm | H | 22 μm |
| R | FeNiCo | 54% Fe 59% Ni 17% Co | −38 μm | 10% | 'p' |  | L | 21 μm |
| S | Chromium | 99.5% Cr | −38 μm | 12% | 'p' |  | H | 22 μm |
| T | Chromium Reox | 99.5% Cr | −38 μm |  | 'p' | 42 μm |  | 22 μm |
| U | Chrome Reox | 99.5% Cr | −38 μm |  | 'p' | 35 μm |  | 22 μm |
| V | Ni50Cr | 50% Ni 50% Cr | −38 μm |  |  | 28 μm |  | 22 μm |

Referring to Table 1, in the chromium samples (B, S, T, U), impurities are, for example C, Si, Na, Ca, but are present only in amounts sufficiently low and well dispersed as to have no significant effect on conductivity.

Samples S, T and U are all samples of chromium having the same Malvern particle size range but obtained from different respective suppliers. Likewise, samples A and H of Mn(34%)-Ni(66%) were obtained from different respective suppliers.

All particles gave metal oxide particles having a metal oxide shell and a metal core.

Each of the alloy particles contained at least two metals of different respective valencies and present in different respective molar properties so as to provide either an n-type or p-type layer.

At least for the samples of cobalt (Sample C) and the alloys Al(66%)-Ni(34%) (Sample J) and Cu(91.6%)-Al(8.4%) (Sample N), powders containing particles as large as 75 μm or 80 μm gave poor oxidation results, while for the alloy powder Cu(91.8%)-Ag(8.2%) (Sample I), it seems that the presence of particles as large as 45 μm resulted in poor oxidation. On the other hand chrome powder containing particles as large as 45 μm were oxidised to a significant extent and gave excellent results. However, for Sample I, the poor oxidation level was probably more likely due to the presence of a large amount of Ag having a valency of only 1, while for Samples J and N, the poor oxidation levels may have been additionally due to the high aluminium content, the small Al atoms tendency to block the path of oxygen into the particles.

Where diodes are to be used to detect high intensity photon X-ray beams in a continuous mode, i.e. with a constantly applied DC voltage, the diodes need to have resistances of 100-200 ohms and higher. Consequently the high resistance oxides of type A, B, F and S, as set out in Table 1 provide the best results.

Experiment 6

Detection Devices

Oxide detector devices were made, consisting of a ceramic substrate with an electrically conductive layer applied to one face, onto which a strip of semi-conductive oxide had been applied.

Electrical contact was made between the electrically conductive layer and a 20 mm square of conductive silver paint applied to the top surface of the oxide layer, such that current flowed through the thickness of the oxide layer under the influence of an applied EMF.

A total of six different semi-conductive transition metal oxide samples had been prepared for testing. Previous tests had shown that such oxides have only 'n' type extrinsic conduction and exhibit a continuous activation energy (band gap) spectrum ranging from 0.1 eV to 8.5 eV-9.6 eV.

It is this wide activation energy spectrum which indicates that such oxides will act as "tunable" radiation detection devices.

The test equipment consisted of an x-ray beam from a synchrotron, test samples and a 24 volt variable DC power supply with current limitation.

Each sample was successively fixed at 60-75 mm from the x-ray radiation source, such that the beam impinged onto part of the 20 mm square silver contact area and insulated copper leads connected the sample to the variable DC power source.

A voltage was applied to the sample and the base current flow allowed to stabilise and the value noted.

The x-ray beam was allowed to impinge onto the silver contact area and any change in the current flowing observed and recorded.

The basis for the expectation of a change in current values lies in the fact that the action of the x-ray radiation upon the semi-conductive oxides would be to generate charge carriers, illustrated as an increase in current flow.

The results are set out in Table 4 giving the initially applied voltage and current and any current flow variations with time.

TABLE 4

TEST RESULTS BY SAMPLE
CURRENT VALUES IN MILLIAMPS

| Sample No | Applied Volts | Applied Current | Change in current - Milliamps with Seconds Time | | | | | | | | |
|---|---|---|---|---|---|---|---|---|---|---|---|
| | | | 60 s | 120 s | 180 s | 240 s | 300 s | 360 s | 420 s | 480 s | 540 s |
| 1 | 16.7 | 6.5 mA | 7.0 mA | | | | | Mn 34Ni | | | |
| 2 | 0.55 | 297 | 510 | 610 | 670 | 705 | 728 | 745 | 760 | 783 | Fe50Cr |
| 3 | 0.10 | 115 | | | | | No Change Fe50Cr | | | | |
| 4 | 0.10 v | 330 | | | | | No Change | | | | |
| 5 | 0.90 v | 370 | 440 | 485 | 490 | 535 | 570 | 620 | | FeCrAl | |
| 6 | 0.10 v | 231 | | | | | No Change | | | | |

However, for low intensity but high energy alpha, beta and γ gamma radiation sources it is possible to use low resistance oxides such as types C, I, J, K, L, N and R but operated under pulsed mode conditions.

In the pulsed mode a voltage is applied as a timed pulse and allowed to decay to zero between each pulse. Ideally the frequency at which the voltage pulses are applied corresponds to the frequency of the radiation being emitted by an active source.

For example, high intensity X-ray photon sources emit photons in the range of $10^8$-$10^{15}$ per second. For low intensity sources this range is of the order of $10^2$-$10^4$ per second.

For the three samples, 3, 4 & 6, which showed no change in current flow, it is almost certain that the applied voltage was not sufficient to activate the required energy levels at which charge carriers would be generated by the incident radiation, and to cause such charge carriers to flow in an external circuit.

This may be remedied by applying a higher initial voltage and limiting the initial current flow.

For samples 2 and 5 the rate of charge carrier generation is very significant, of the order of an increase of 100% over the initial current level, and the rate of increase is indicative of activation of different energy levels with time at constant voltages of only 0.55 and 0.90 volts.

All the oxide sample matrices were produced to the same thickness but these can be varied to increase or decrease the inherent ambient resistances such that higher or lower initial voltages may be utilised, allowing the activation of more energy levels and consequent better charge carrier generation.

The application of higher initial voltages will also give better charge carrier mobilities, increasing the sensitivity and response rate of such devices.

There was no evidence of any heating of any of the test samples as a result of exposure to the x-ray radiation, and hence no generation of charge carriers from thermal effects.

Example 2

Further Development

From tests such as those described in Example 1 and Experiments 1-6 and the results of which are as shown in Tables 1-4, it is found that, for any given metal or alloy powder, the oxidation reaction is dependent upon the time, temperature and surface area per unit weight of powder. In Example 1, the time and temperature were fixed by the various gas and powder flow rates and the distance of travel of the particles between their entry into the flame and their subsequent quenching after oxidation, all of which remained unchanged from one sample to another. Thus, for any powder of a given metal constitution, the rate of oxidation reaction increases with increasing surface area per unit weight of powder entering the flame, which surface area increases with a decrease in particle size.

It is also found that increasing the feed rate of the combustion gas while maintaining a stoichiometric amount of oxygen:fuel therein further increased the heat of the flame.

Thus, many of the tests described in Example 1, as shown in Table 3, were repeated except that, for some samples, the particle size was considerably reduced and, in all cases the feed rate of combustion gas was 50 l/min oxygen:20 l/min acetylene.

In the case of chromium (Sample B), the oxygen shroud was omitted.

The results are as shown in Table 4, which additionally indicates some results for new Samples W-Z and AA-BB, expected to find use in the manufacture of neutron detecting devices.

As in Table 3, above, for each Sample the Malvern layer particle size range extends from a minimum of +1 μm to a maximum as shown in Table 5 (e.g. −38 μm).

Table 5 also indicates the crystal structures of the partially oxidized metals, as determined by XRD, the respective spectra of which are shown in FIGS. 7-20. These particles, having a metal core and a metal oxide shell of the particular crystal structures shown are believed to be novel materials.

TABLE 5

Oxide Data

| Sample | Metal or Alloy | Composition wt % | Powder Particle Size Range | % Oxidation by Weight | Conduction Type 'n'/'p' | Resistance H = High L = Low | Chemical Formula | Mineral name/ chemical name | Crystal Structure |
|---|---|---|---|---|---|---|---|---|---|
| A | Mn34Ni | 34% Mn 66% Ni | −38 μm | 21% | 'n' | H | $Ni_6MnO_8$ | Nickel Manganese oxide | Inverted spinel |
| B | Chrome | 99.5% Cr | −38 μm | 21% | 'p' | H | $Cr_2O_3$ | Eskolaite | Hexagonal |
| C | Cobalt | 99.5% Co | −38 μm | 21% | 'p' | L | CoO | Cobalt oxide | Face-centred cubic |
| F | Iron | 99.5% Fe | −38 μm | 28% | 'p' | H | $Fe^{2+}Fe^{3+}_2O_4$ | Mangetite | Spinel (Cubic) |
| K | Fe20Cr5Al | 75% Fe 20% Cr 15% Al | −38 μm | 20% | 'n' | L | $Fe(Cr,Al)_2O_4$ | Donathite | Spinel (Cubic) |
| L | Nickel | 99.5% Ni | −38 μm | 22% | 'p' | L | NiO | Nickel oxide | Face-Centred cubic |
| M | Fe50Ni | 50% Fe 50% Ni | −38 μm | 24% | 'n' | L | $NiFe_2O_4$ + NiO | Trevorite and Bunsenite | Spinel (cubic) + Face-centred cubic |
| O | FeCo | 50% Fe 50% Co | −38 μm | 25% | 'n' | L | $CoFe_2O_4$ + CoO | Cobalt iron oxide + Cobalt oxide | Spinel (Cubic) + Face-centred cubic |
| P | Sb80 | 95% Ni 5% Al | −38 μm | 17% | 'n' | H | NiO + Ni | Bunsenite + Nickel metal | Face-centred cubic |
| Q | FeCr | 50% Fe 50% Cr | −38 μm | 21% | 'n' | H | $FeCr_2O_4$ | Chromite | Spinel (cubic) |
| R | FeNiCo | 58% Fe 29% Ni 17% Co | −38 μm | 26% | 'p' or weak 'n' | L | $CoFe_2O_4$ or both | Trevorite or Cobalt Iron Oxide | Both are Spinel structures |
| V | Ni50Cr | 50% Ni 50% Cr | −38 μm | | 'n' | | $NiCr_2O_4$ | Nichromite + Bunsenite | Spinel (Cubic) |
| W | Vanadium | 99.55% V | −45 μm | 23% | 'p' | | $V_2O_3$ + $V_2O_5$ | Vanadite | Cubic |
| X | FeV | 82% Fe 18% V | −45 μm | 24% | 'n' | | $V_2O_3$ + $FeV_2O_4$ | | Spinel |

TABLE 5-continued

Oxide Data

| Sample | Metal or Alloy | Composition wt % | Powder Particle Size Range | % Oxidation by Weight | Conduction Type 'n'/'p' | Resistance H = High L = Low | Chemical Formula | Mineral name/ chemical name | Crystal Structure |
|---|---|---|---|---|---|---|---|---|---|
| Y | GdCo | 34% Gd 66% Co | −45 μm | 22% | 'n' | | CoO + GdCO$_2$O$_4$ | | Spinel |
| Z | FeB | 82% Fe 18% B | −45 μm | 24% | 'p' | | Fe$_2$O$_3$ + FeB$_2$O$_3$ | | Cubic |
| AA | NiB | 82% Ni 18% B | −45 μm | 22% | 'n' | | NiBO$_4$ + NiO | | Spinel |
| BB | FeCrB | 5% Fe 80% Cr 15% B | −45 μm | 20% | 'n' | | Fe[Cr$_2$B]$_2$O$_4$ | | Spinel |

As can be seen from Sample C of Table 5, for cobalt particles, a decrease in particle size of from −80 μm (maximum Malvern size) to −38 μm gives an increase in the degree of oxidation of from 5% (Table 1) to 21% (Table 4), while for each of Samples A, F, K, L, M, O, P and Q a significant increase in the degree of oxidation resulted from an increase in throughput of the combustion gases (while retaining a stoichiometric ratio of oxygen:fuel gas) of 20 vol. %.

From the above experiments, the following conclusions may be drawn:

(a) For good semi-conductive properties, the degree of oxidation is preferably at least 20% by weight and the higher the better.

(b) Those alloys with relatively high percentages of aluminium are very difficult to oxidise; it is believed that the relatively small aluminium atoms, if present in large amounts, block the internal passage of oxygen into, and internal flow of metal within, the particles.

(c) Many crystalline structures of the oxide fall into three categories, spinel, hexagonal or cubic and such structures lend themselves to improved semiconductive properties.

(d) It is often possible to predict the electronic conduction of semi-conductive oxides from their crystal structures.

(e) The crystalline structures of the oxides produced by the first, preoxidation, stage are particular to and dependent upon the pre-oxidation process.

Thus, it is found that, especially for metals and alloys having a melting point of at least 700° C., especially at least 850° C., more especially at least 1000° C., the first, preoxidation, stage process may provide not only a significantly increased degree of oxidation but a crystalline oxide structure suitable for providing improved semiconductive properties.

In particular, we find that where the oxide has a spinel structure it will give 'n' type conduction and that the chemical formula for the oxide is 'AB$_2$O$_4$', where 'A' is a divalent metal atom and 'B' is a trivalent atom. Similarly, where the oxide of a single metal has a hexagonal structure, such as Cr$_2$O$_3$, or a cubic form like NiO or CoO, then it will give 'p' type conduction.

One apparent anomaly is iron oxide as magnetite. This is a classic spinel structure and should therefore give 'n' type conduction, whereas in fact it gives 'p' type properties, as produced by the preoxidation step. The explanation for this is probably that the preoxidation process does not give a full spinel, but more a cubic form.

It must be appreciated that the semi-conductive oxide crystalline structures produced by the preoxidation process are not those which could be easily produced by any other means, chemically or otherwise. Indeed, it is believed that such partially oxidised metal-containing particles are individual and peculiar to the process itself and enable the production of particularly effective semi-conductive oxide sensors.

From the above, it can be seen that the oxide structures developed in accordance with the invention, consisting of a metal core surrounded by and situated within an oxide matrix and having a high degree of oxidation and/or consisting of combinations of metals or differing valencies in different properties, are unique and are eminently suitable for use in radiation detection devices.

Thus, in the literature to date regarding radiation detectors, the over-riding concept has been that the materials and compounds utilised are chemically 'pure'. In the case of silicon and germanium diodes, the basic silicon and germanium wafers are of the highest possible purity and are only 'doped' with other elements to strictly prescribed levels of parts per million.

Additionally, the sodium iodide and cadmium-zinc-telluride crystals utilised for single layer, wide band gap devices are also produced to the highest possible purity level. It is believed that none of these chemical structures envisage a separate element/substance, or combination of substances, surrounded by a separate combination of other substances.

Conversely, successful operation of the diodes produced in accordance with certain aspects of the invention is entirely dependent upon the principle that the semi-conductive oxides having a high degree of oxidation consist of a structure comprised of a metallic centre enclosed within and surrounded by an oxide matrix. It is this structure, coupled with the high degree of oxidation, which gives potentially insulating oxides their conductive properties.

In addition, in accordance with other aspects of the invention, it is the principle of having combinations of metals of differing valencies in different proportions which enables the production of devices reliant upon the 'n' and 'p' type semi-conductive properties.

The invention claimed is:

1. A metal oxide particle which particle comprises:
a core containing at least one elemental metal; and
a crystalline shell containing an oxide of the metal,
characterized in that the metal oxide particle is semiconductive and has
a degree of oxidation expressed as a percentage by weight of oxygen in the total weight of the particle of at least 17%;
a maximum particle size of is 50 μm; and
a volume ratio of shell to core of at least 1.1:1.

2. The metal oxide particle of claim 1 wherein the core contains a plurality of elemental metals and wherein the shell contains an oxide of each of the metals.

3. The metal oxide particle of claim 1 wherein the core contains a plurality of alloys and wherein the shell contains an oxide of each of the alloys.

4. The metal oxide particle of claim 1 wherein the core contains at least one alloy and wherein the shell contains an oxide of each elemental metal and each alloy present in the core.

5. The metal oxide particle of claim 1 wherein the degree of oxidation is from 20 to 24%.

6. The metal oxide particle of claim 1 comprising a metal component and an oxygen component, the metal component including, in an amount by weight of the total weight of the metal component, at least 94% of one or more metal elements, each of the one or more metal elements being in elemental form or being part of an alloy; and
  at least one metal element of the at least 94% of the metal component is present in an amount of at least 5% by weight of the metal component and is selected from the group consisting of transition element numbers 21-29, 39-47, 57-79, 89-105, indium, tin, gallium, antimony, bismuth, tellurium, vanadium, boron and lithium.

7. The metal oxide particle of claim 6 wherein the metal component further comprises at least one additional metal element, the additional metal element being present in an amount of no more than 6% by weight of the total weight of the metal component, including any impurities.

8. The metal oxide particle of claim 6 wherein at least one metal element of the at least 94% of the metal component is selected from the group consisting of manganese, nickel, chromium, cobalt and iron.

9. The metal oxide particle of claim 8 wherein the metal component comprises, by weight of the metal component, at least 99.5% by weight of a single transition metal selected from the group consisting of chromium, cobalt, iron and nickel.

10. The metal oxide particle of claim 8 wherein the metal component comprises, by weight of the metal component, at least 99.5% by weight of an alloy of at least two metals selected from the group consisting of chromium, cobalt, iron, nickel and manganese.

11. The metal oxide particle of claim 6 further comprising aluminum in an amount no greater than 5% by weight of the metal component, including any impurities.

12. The metal oxide particle of claim 6 wherein at least 94% of the metal component is an alloy selected from the group consisting of manganese (34 wt %)-nickel (66 wt %), iron (75 wt %)-chromium (20 wt %)-aluminum (5 wt %), iron (50 wt %)-nickel (50 wt %), iron (50 wt %)-cobalt (50 wt %), iron (50 wt %)-chromium (50 wt %), nickel (50 wt %)-chromium (50 wt %), nickel (95 wt %)-aluminum (5 wt %), and iron (54 wt %)-nickel (29 wt %)-cobalt (17 wt %).

13. The metal oxide particle of claim 6 wherein at least one metal element is selected from the group consisting of vanadium, gadolinium and boron.

14. The metal oxide particle of claim 13 wherein the metal component includes, in an amount by weight of the total weight of the metal component, at least 95.5% of at least two metal elements being in elemental form or being part of an alloy; wherein a first metal element is selected from the group consisting of vanadium, gadolinium and boron; and wherein a second metal element is selected from the group consisting of iron, cobalt, nickel and chromium.

15. The metal oxide particle of claim 14 wherein the first metal element comprises vanadium and wherein the second metal element is an alloy selected from the group consisting of iron (82 wt %)-vanadium (18 wt %), gadolinium (34 wt %)-cobalt (66 wt %), iron (82 wt %)-boron (18 wt %), nickel (82 wt %)-boron (18 wt %) and iron (5 wt %)-chromium (80 wt %)-boron (15 wt %).

16. The metal oxide of claim 6 wherein at least one metal element has a valency of at least 2.

17. The metal oxide particle of claim 1 wherein the core comprises a metal alloy having a first metal and a second metal, the first metal having a higher valency than the second metal, the first metal being present in the particle at a molar concentration lower than that of the second metal, thereby providing a particle suitable for use in an n-type semiconductor.

18. The metal oxide particle of claim 17 wherein the first metal is selected from the group consisting of manganese, chromium, nickel, cobalt, vanadium and gadolinium and the second metal is selected from the group consisting of iron, nickel, cobalt and boron.

19. The metal oxide particle of claim 1 wherein the core comprises a first metal and a second metal, the first metal having a higher valency than the second metal, the first metal being present in the particle at a molar concentration higher than that of the second metal, thereby providing a particle suitable for use in a p-type semiconductor.

20. The metal oxide particle of claim 19 wherein the first metal is selected from the group consisting of iron and boron and the second metal is selected from the group consisting of nickel, cobalt and boron.

21. The metal oxide particle of claim 1 wherein the core comprises a single metal present in at least 99 mole % and no more than 0.1 mole % of any other individual metal, thereby providing a particle suitable for use in an n-type semiconductor or a p-type semiconductor.

22. The metal oxide particle of claim 21 wherein the single metal is selected from the group consisting of iron, chromium, cobalt and nickel.

* * * * *